United States Patent
Kim et al.

(10) Patent No.: US 11,330,566 B2
(45) Date of Patent: May 10, 2022

(54) METHOD AND DEVICE FOR SIDELINK COMMUNICATION FOR SUPPORTING MULTIPLE BEAMS

(71) Applicant: LG ELECTRONICS INC., Seoul (KR)

(72) Inventors: Heejin Kim, Seoul (KR); Hanbyul Seo, Seoul (KR); Seungmin Lee, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 16/757,576

(22) PCT Filed: Oct. 19, 2018

(86) PCT No.: PCT/KR2018/012388
§ 371 (c)(1),
(2) Date: Apr. 20, 2020

(87) PCT Pub. No.: WO2019/078661
PCT Pub. Date: Apr. 25, 2019

(65) Prior Publication Data
US 2020/0359366 A1  Nov. 12, 2020

Related U.S. Application Data

(60) Provisional application No. 62/574,226, filed on Oct. 19, 2017.

(51) Int. Cl.
*H04W 72/04* (2009.01)
*H04L 1/18* (2006.01)

(52) U.S. Cl.
CPC ....... *H04W 72/0406* (2013.01); *H04L 1/1812* (2013.01); *H04W 72/046* (2013.01)

(58) Field of Classification Search
CPC .......... H04W 72/0406; H04W 72/046; H04L 1/1812
See application file for complete search history.

(56) References Cited

U.S. PATENT DOCUMENTS

2013/0286960 A1    10/2013  Li et al.
2015/0244432 A1    8/2015   Wang
(Continued)

FOREIGN PATENT DOCUMENTS

WO    2017062028    4/2017

OTHER PUBLICATIONS

LG Electronics, "Discussion on synchronization enhancement for FeD2D," 3GPP TSG-RAN1 Meeting #90, R1-1713113, Aug. 2017, 4 pages.
ZTE, "Sidelink Feedback of FeD2D Relay," 3GPP TSG RAN WG1 Meeting #90, R1-1712921, Aug. 2017, 8 pages.
Ericsson, "Transmit diversity solutions for Rel-15 PSCCH and PSSCH transmissions," 3GPP TSG RAN WG1 Meeting #90, R1-1712655, Aug. 2017, 6 pages.
(Continued)

*Primary Examiner* — Jeffrey M Rutkowski
*Assistant Examiner* — Jasper Kwoh
(74) *Attorney, Agent, or Firm* — Lee Hong Degerman Kang & Waimey

(57) ABSTRACT

A method and a device for a sidelink in a wireless communication system are provided. A transmission terminal supporting a sidelink performs transmission/reception beam pairing by using control information for a sidelink. The transmission terminal and a reception terminal can find an optimum transmission/reception beam pair on the basis of a method of repeatedly transmitting/receiving control information by the sidelink. Therefore, an appropriate transmission/reception beam pair can be found without repeatedly transmitting a synchronization signal. The reception termi-
(Continued)

nal can provide feedback information on the received control information to the transmission terminal. The transmission terminal can determine an optimum transmission/reception beam pair on the basis of the feedback information.

16 Claims, 22 Drawing Sheets

(56) References Cited

U.S. PATENT DOCUMENTS

| | | | |
|---|---|---|---|
| 2015/0341095 A1 | 11/2015 | Yu et al. | |
| 2016/0073408 A1* | 3/2016 | Sartori | H04W 72/0453 370/329 |
| 2019/0052436 A1* | 2/2019 | Desai | H04L 1/1861 |
| 2019/0053203 A1* | 2/2019 | Xu | H04W 72/04 |
| 2019/0327732 A1* | 10/2019 | Yoon | H04W 56/0005 |
| 2019/0372647 A1* | 12/2019 | Su | H04L 5/0053 |
| 2020/0092685 A1* | 3/2020 | Fehrenbach | H04B 7/2606 |
| 2020/0296749 A1* | 9/2020 | Freda | H04L 47/286 |

OTHER PUBLICATIONS

Intel Corporation, "Discovery Enhancements to Aid Communication Establishment for UE-to-NW Relaying," 3GPP TSG RAN WG1 Meeting #90, R1-1712516, Aug. 2017, 6 pages.

Intel Corporation, "Design Options to Enhance Sidelink Discovery for Wearable and IoT Use Cases," 3GPP TSG RAN WG1 Meeting #90, R1-1712515, Aug. 2017, 7 pages.

European Patent Office Application Serial No. 18867497.2, Search Report dated Jun. 9, 2021, 12 pages.

PCT International Application No. PCT/KR2018/012388, International Search Report dated Jan. 16, 2019, 6 pages.

* cited by examiner

FIG. 8
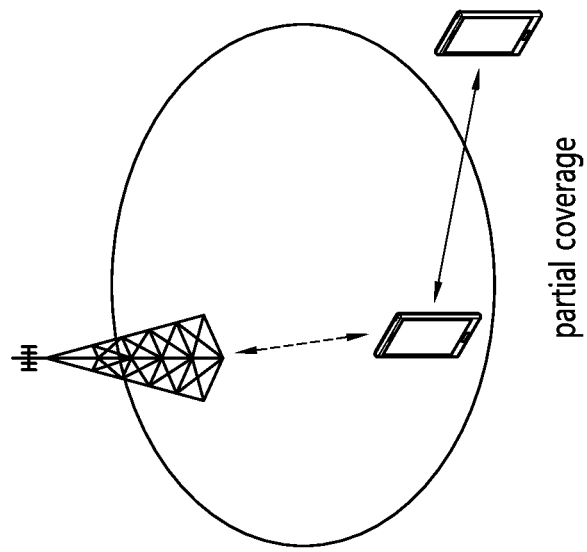
partial coverage
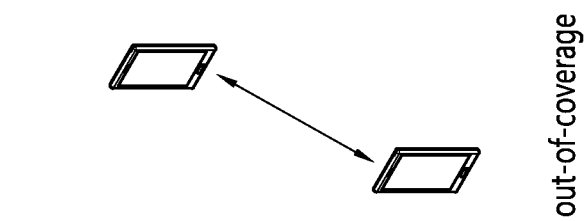
out-of-coverage
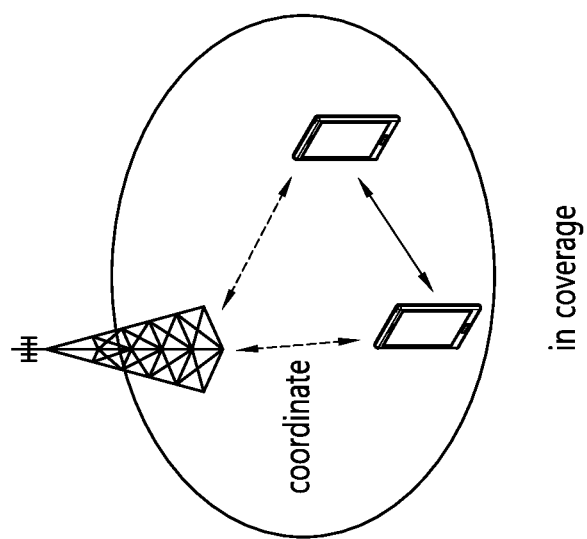
in coverage

FIG. 12
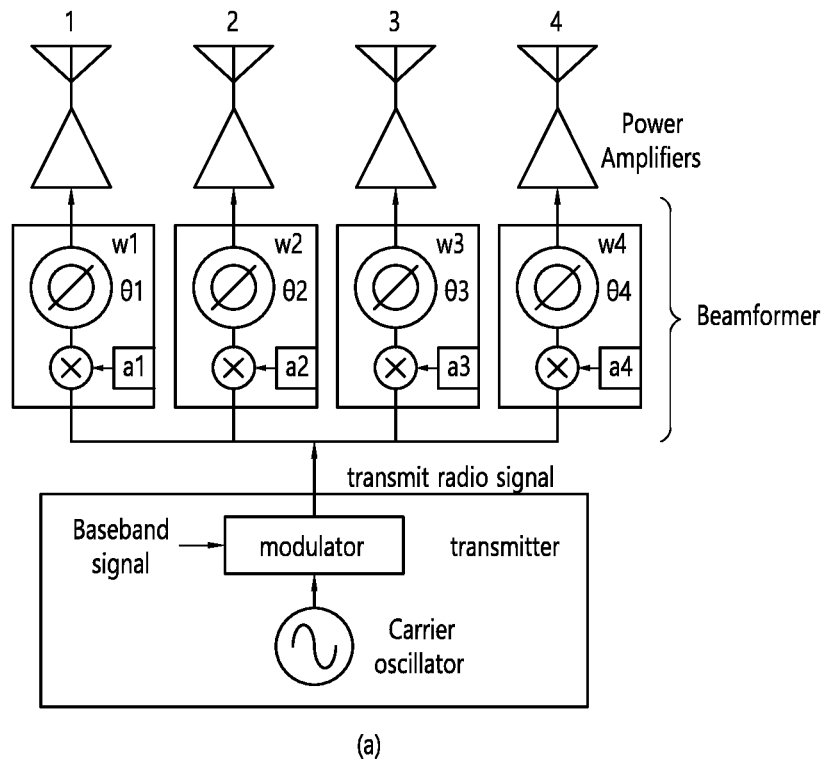
(a)
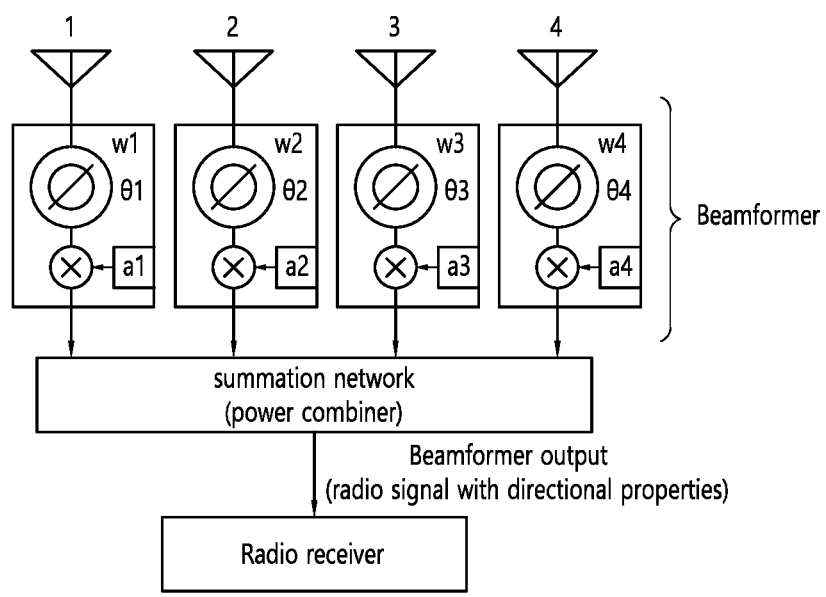
(b)

FIG. 13
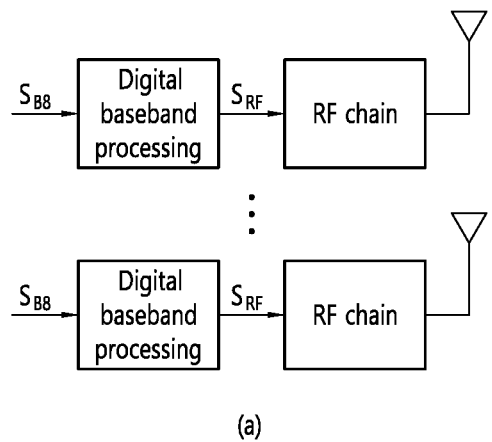
(a)
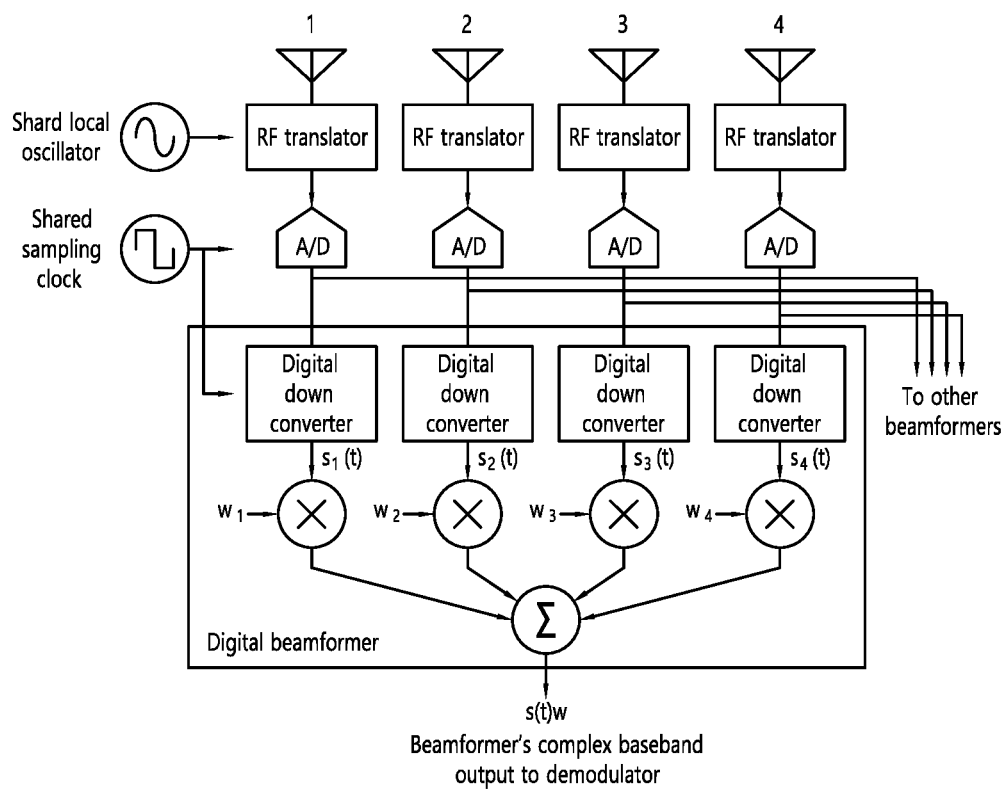
(b)

METHOD AND DEVICE FOR SIDELINK COMMUNICATION FOR SUPPORTING MULTIPLE BEAMS

CROSS-REFERENCE TO RELATED APPLICATIONS

[0] This application is the National Stage filing under 35 U.S.C. 371 of International Application No. PCT/KR2018/012388, filed on Oct. 19, 2018, which claims the benefit of U.S. Provisional Application No. 62/574,226, filed on Oct. 19, 2017, the contents of which are all hereby incorporated by reference herein in their entirety.

BACKGROUND

Technical Field

The present specification relates to a wireless communication system supporting sidelink. More particularly, the present specification proposes a method and apparatus for an improved communication scheme using a plurality of transmit (TX) beams and/or receive (RX) beams used on the sidelink.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced (LTE-A) is one of promising candidates for the IMT-advanced.

Meanwhile, recently, there is a growing increase in a sidelink or device-to-device (D2D) technique for performing direct communication between devices. In particular, the sidelink or D2D is drawing attention as a communication technique for a public safety network. Although a commercial communication network is rapidly changing to LTE, the public safety network is primarily based on a 2G technique at present in terms of costs and a problem of a collision with the conventional communication protocol. Such a technical gap and a demand on an improved service results in an effort of improving the public safety network.

The public safety network has a higher service requirement (reliability and safety) in comparison with the commercial communication network, and in particular, even if cellular communication is performed in an out-of-coverage state or is not available, also demands direct signal transmission/reception between devices, i.e., a sidelink (or D2D) operation.

The sidelink (or D2D) operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

The aforementioned sidelink (or D2D) communication may be extended to apply to signal transmission/reception between vehicles, and communication related to the vehicle is particularly called vehicle-to-everything (V2X) communication.

In the V2X, the term 'X' may be a pedestrian, a vehicle, or an infrastructure/network, which may be indicated respectively by V2P, V2V, or V2I/N.

SUMMARY

The present specification proposes an improved method and apparatus applicable to sidelink/device-to-device (D2D)/vehicle-to-everything (V2X) communication. Specifically, an example of the present specification proposes an improved beam paring scheme for sidelink/D2D/V2X communication. Specifically, an example of the present specification proposes a scheme of discovering a combination of a proper transmit (TX) beam and a receive (RX) beam by using not a synchronization signal but control information for sidelink.

The present specification proposes an example related to a transmitting user equipment supporting sidelink. For example, the transmitting user equipment may obtain synchronization for the sidelink. In addition, after obtaining the synchronization, the transmitting user equipment may transmit control information for the sidelink to a receiving user equipment through the sidelink, based on a plurality of TX beams, wherein the control information is transmitted to the receiving user equipment through the plurality of RX beams of the receiving user equipment. In addition, the transmitting user equipment may receive TX beam information related to at least one of the plurality of TX beams from the receiving user equipment. In addition, the transmitting user equipment may transmit sidelink data to the receiving user equipment through at least one of the plurality of TX beams, based on the TX beam information. Another example of the present specification may be applied to a receiving user equipment, a base station, or the like communicating with the transmitting user equipment.

The present specification proposes a scheme of selecting/obtaining/determining a combination of a TX beam and RX beam for sidelink communication. Based on an embodiment of the present specification, a proper beam pair for sidelink may be selected/obtained/determined. Specifically, an example of the present specification proposes a scheme of repeatedly transmitting control information not for a synchronization signal but for the sidelink. Accordingly, it is possible to solve a problem in that a radio resource is wasted when the synchronization signal is unnecessarily repeatedly transmitted. In addition, through a scheme of repeatedly transmitting control information proposed by the present specification, a transmitting user equipment selects/obtains/determines a TX/RX beam pair through minimal information. Therefore, an example of the present specification can increase efficiency of sidelink communication. In addition, an example of the present specification proposes an efficient frame format used when control information is repeatedly transmitted, thereby increasing efficiency of sidelink communication.

BRIEF DESCRIPTION OF THE DRAWINGS

FIG. 8 is a drawing showing an example of a scenario to which sidelink is applied.

FIG. 12 shows an example of the conventional analog beamforming scheme.

FIG. 13 shows an example of the conventional digital beamforming scheme.

DESCRIPTION OF EXEMPLARY EMBODIMENTS

Technical features described below may be used in a communication standard by the $3^{rd}$ generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system include LTE-advanced (LTE-A), LTE-A Pro, and/or a5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

Figure 1:
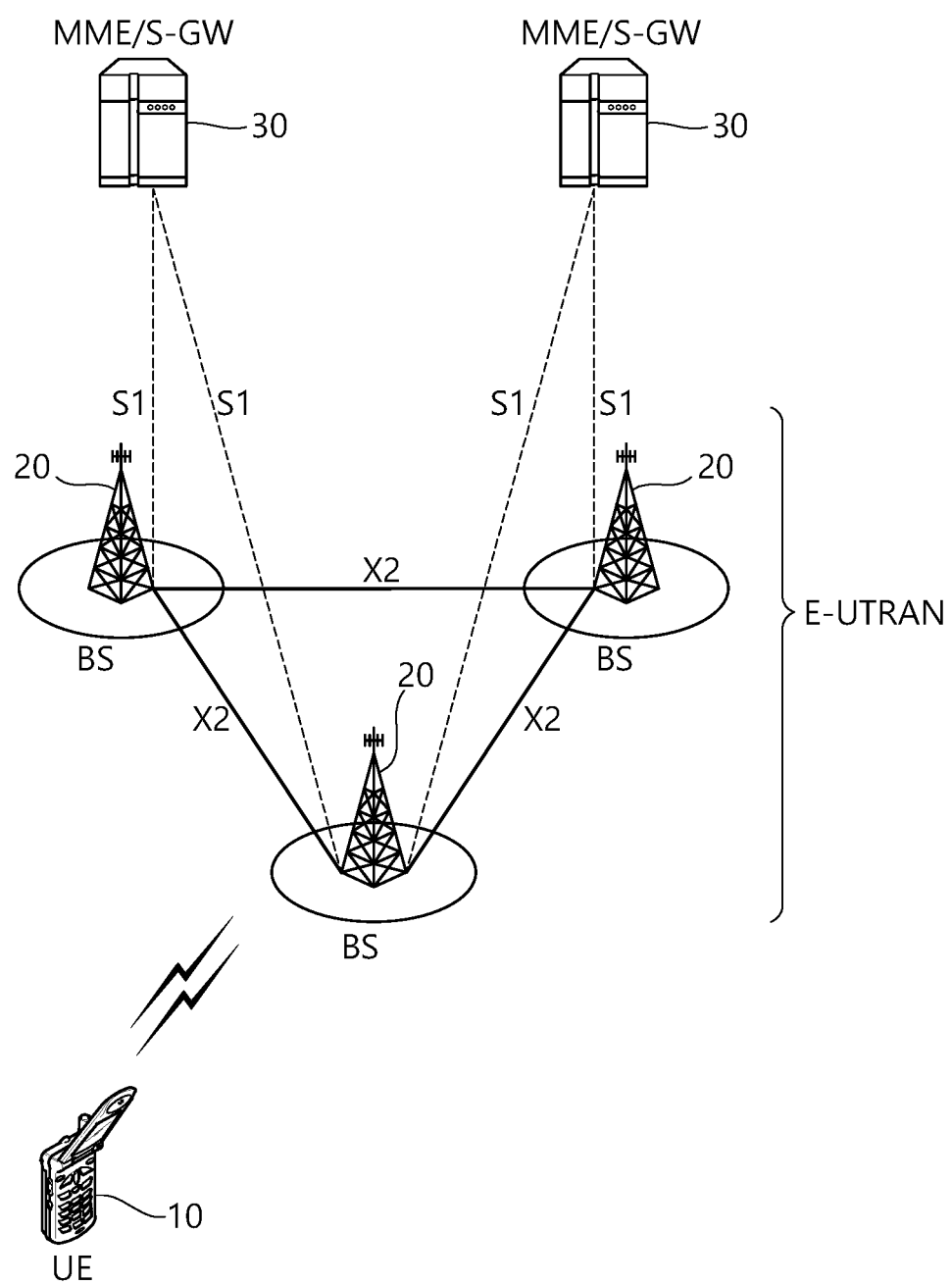
FIG. 1 shows an example of a wireless communication system to which a technical feature of the present specification is applicable.

FIG. 1 shows an example of a wireless communication system to which a technical feature of the present specification is applicable. Specifically, FIG. 1 is an example based on an evolved-universal terrestrial radio access network (E-UTRAN). The aforementioned LTE is part of evolved-UMTS (E-UMTS) using the E-UTRAN.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
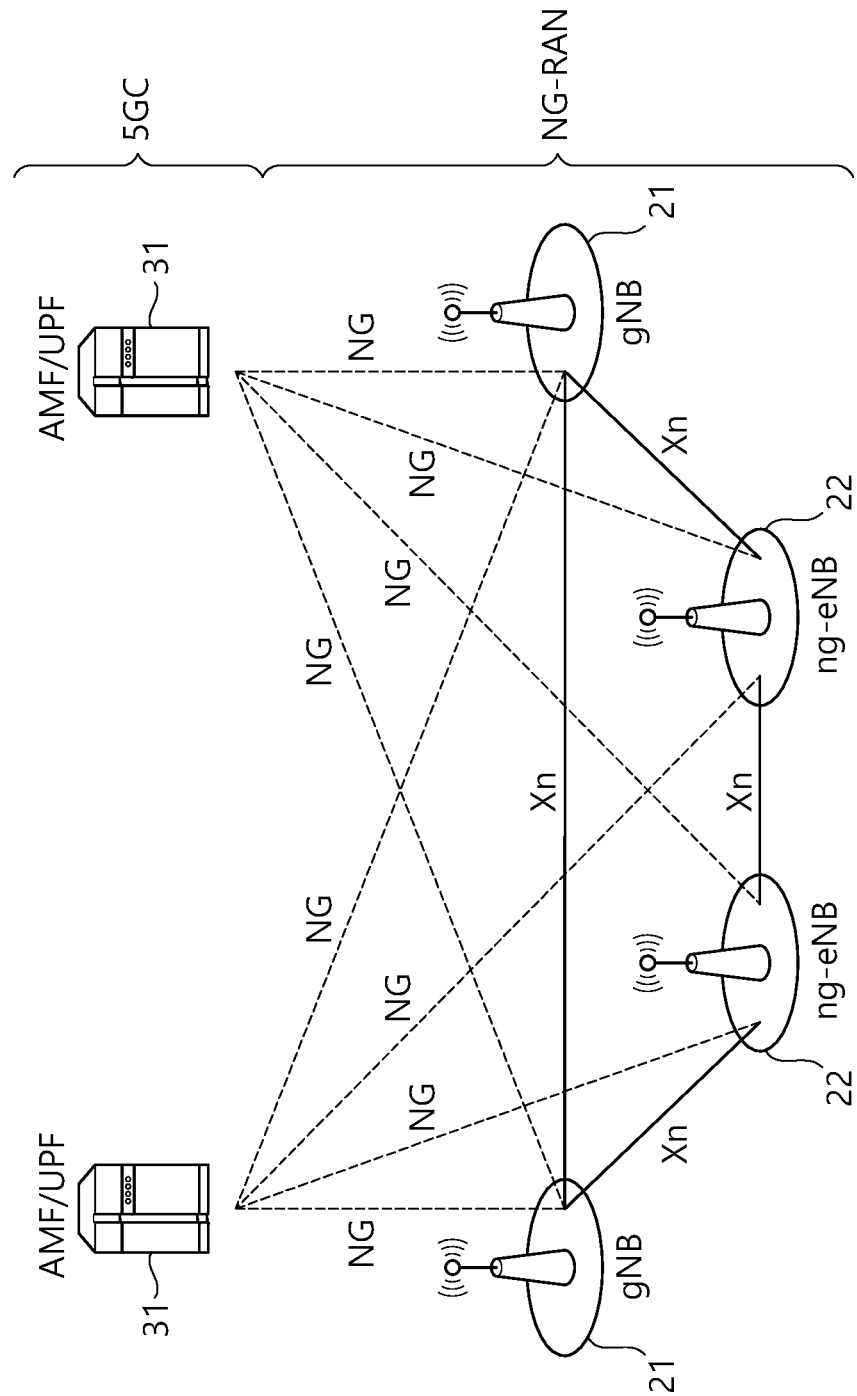
FIG. 2 shows another example of a wireless communication system to which a technical feature of the present specification is applicable.

FIG. 2 shows another example of a wireless communication system to which a technical feature of the present specification is applicable. Specifically, FIG. 2 is an example in which a 5G new radio (NR) standard is utilized. A communication entity used in the 5G NR standard (hereinafter, "NR" standard) incorporates all or some functions of the entity (eNB, MME, S-GW) introduced in FIG. 1, and may be identified as a name "NG" or "ng" so as to be distinguished from the conventional standard.

The system of FIG. 2 includes a next generation—radio access network (NG-RAN) communicating with a user equipment (UE). NG-RANs 21 and 22 are entities corresponding to a BS, and include a gNB 21 or an ng-eNB 22. A network interface called an Xn interface is defined between the NG-RANs 21 and 22. The gNB 21 provides an NR user plane and control plane for the UE, and is connected to a 5G core network (5GC) via the NG interface of FIG. 2. The Ng-eNB 22 is an entity for providing a user plane and control plane based on evolved-universal terrestrial radio access (UTRA), and is connected to the 5GC via the NG interface.

An access and mobility management function (AMF) is an entity including a function of the conventional MME, and communicates with the NG-RANs 21 and 22 via an NG-C interface. The NG-C interface is a control plane interface between the NG-RAN and the AMF.

A user plane function (UPF) is an entity including a function of the conventional S-GW, and communicates with the NG-RANs 21 and 22 via an NG-U interface. The NG-U interface is a user plane interface between the NG-RAN and the AMF.

On the system of FIG. 1 and/or FIG. 2, layers of a radio interface protocol between the network (NG-RAN and/or E-UTRAN) and the UE can be classified into a first layer (L1), a second layer (L2), and a third layer (L3) based on the lower three layers of the open system interconnection (OSI) model that is well-known in the communication system.

Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and a BS.

Hereinafter, a structure of a radio frame transmitted/received through a physical channel will be described.

In the LTE standard (and the evolution of the LTE standard), one radio frame consists of 10 subframes in a time domain, and one subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

Unlike the LTE standard, the NR standard supports various numerologies, and thus a radio frame is configured in various structures. In the NR standard, a plurality of subcarrier spacings are supported on a frequency domain. A numerology of the NR is determined by a numerology in use. The plurality of numerologies supported in the NR are shown in Table 1 below. Each numerology is identified by an index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, a subcarrier spacing may be determined as one of 15, 30, 60, 120, and 240 kHz. However, since a specific numeral value is changeable, each spacing (e.g., $\mu$=0, 1 . . . 4) may be indicated by $1^{st}$ and $2^{nd}$ to $5^{th}$ subcarrier spacings (i.e., N subcarrier spacings).

As shown in Table 1, it may not be used to transmit user data (e.g., physical uplink shared channel (PUSCH), physical downlink shared channel (PDSCH), etc.) based on a subcarrier spacing. That is, user data transmission may not be supported only in predetermined at least one subcarrier spacing (e.g., 240 kHz).

In addition, as shown in Table 1, a synchronization channel (e.g., primary synchronization signal (PSS), secondary synchronization signal (SSS), physical broadcast channel (PBCH), etc.) may not be supported based on the subcarrier spacing. That is, the synchronization channel may not be supported only in specific at least one subcarrier spacing (e.g., 60 kHz).

In the NR standard, the number of slots and the number of symbols to be included may be set differently based on various numerologies, i.e., various subcarrier spacings. A specific example thereof may be as shown in Table 2 below.

TABLE 2

| $\mu$ | The number of symbols in slot | The number of slots in radio frame | The number of slots in subframe |
|---|---|---|---|
| 0 | 14 | 10 | 1 |
| 1 | 14 | 20 | 2 |
| 2 | 14 | 40 | 4 |

TABLE 2-continued

| $\mu$ | The number of symbols in slot | The number of slots in radio frame | The number of slots in subframe |
|---|---|---|---|
| 3 | 14 | 80 | 8 |
| 4 | 14 | 160 | 16 |

Based on Table 2, when a first numerology with "$\mu$=0" is applied, one radio frame includes 10 subframes, one subframe corresponds to 1 slot, and 1 slot includes 14 symbols. In the present specification, a 'symbol' means a signal transferred for a specific time duration, and for example, may mean a signal generated by orthogonal frequency division multiplexing (OFDM) processing. That is, a symbol of the present specification may mean an OFDM/OFDMA symbol or an SC-FDMA symbol or the like. A cyclic prefix (CP) may be located between the symbols.

An example of Table 2 may be an example to be applied to a normal CP.

Figure 3:
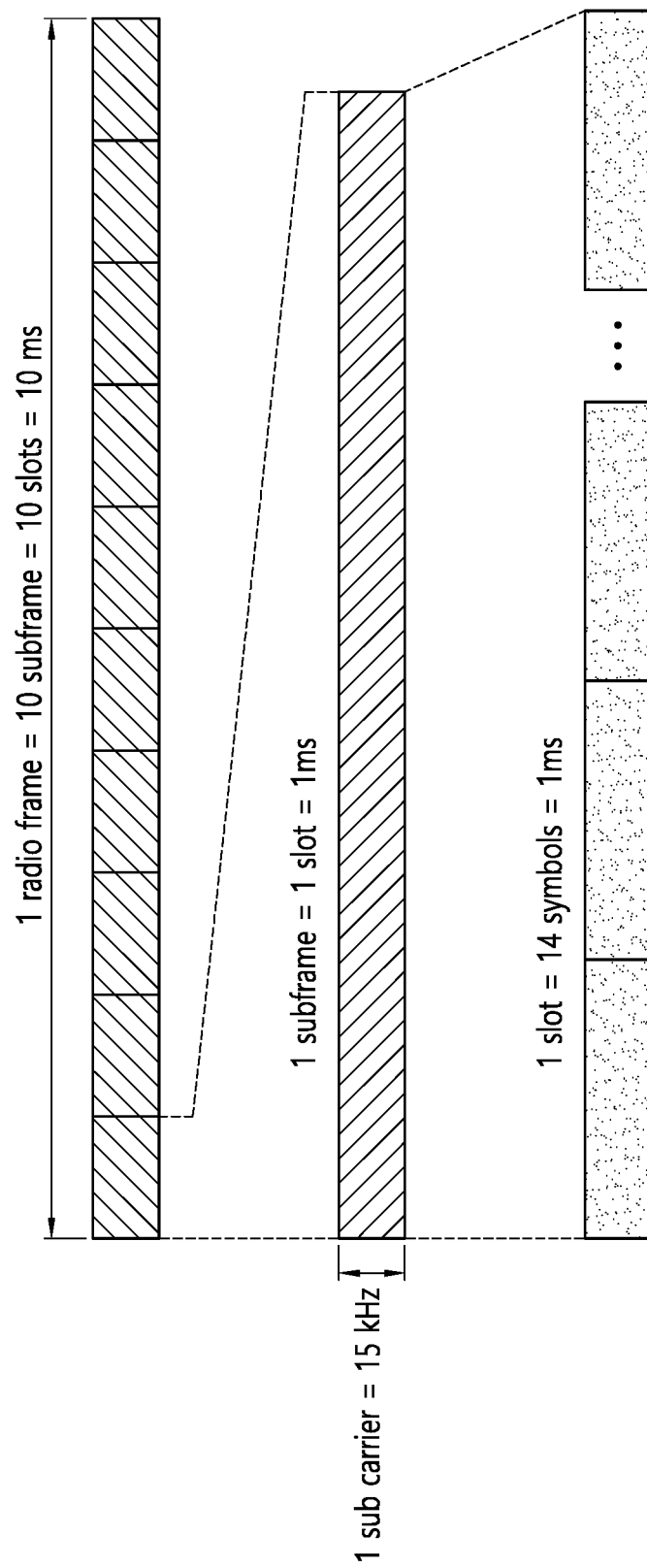
FIG. 3 shows an example to which a specific numerology is applied.

FIG. 3 shows an example to which a specific numerology is applied. That is, FIG. 3 shows a case of $\mu$=0.

Figure 4:
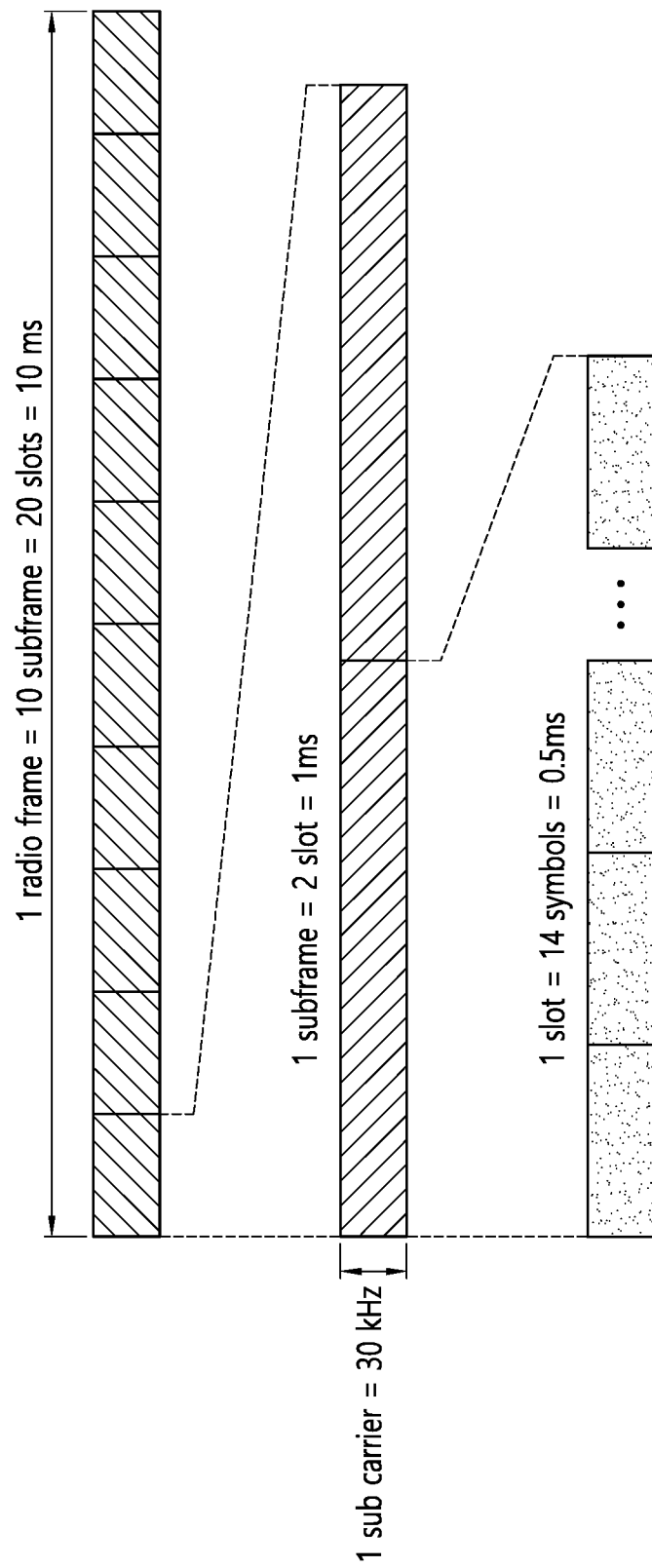
FIG. 4 shows an example to which another numerology is applied.

FIG. 4 shows an example to which another numerology is applied. That is, FIG. 4 shows a case of $\mu$=1.

Meanwhile, frequency division duplex (FDD) and/or time division duplex (TDD) may be applied in a wireless system to which an example of the present specification is applied. When TDD is applied, uplink and downlink subframes are allocated on a subframe basis in an LTE system.

In case of an NR standard/system, each symbol may be divided into downlink (indicated by D), flexible (indicated by X) and uplink (indicated by U). The content of the following table may be applied commonly to a specific cell, or may be applied commonly to adjacent cells, or may be applied individually or differently for each UE.

TABLE 3

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of explanation, Table 3 shows only part of a format (e.g., TDD format) defined in the actual NR standard. A specific allocation scheme may be changed or added.

A UE may have a slot format (i.e., TDD format) configured through a higher layer signal, may have a slot format configured through downlink control information (DCI) transmitted through a physical downlink control channel (PDCCH), or may have a slot format configured through a combination of a higher layer signal (RRC signal) and DCI.

Figure 5:
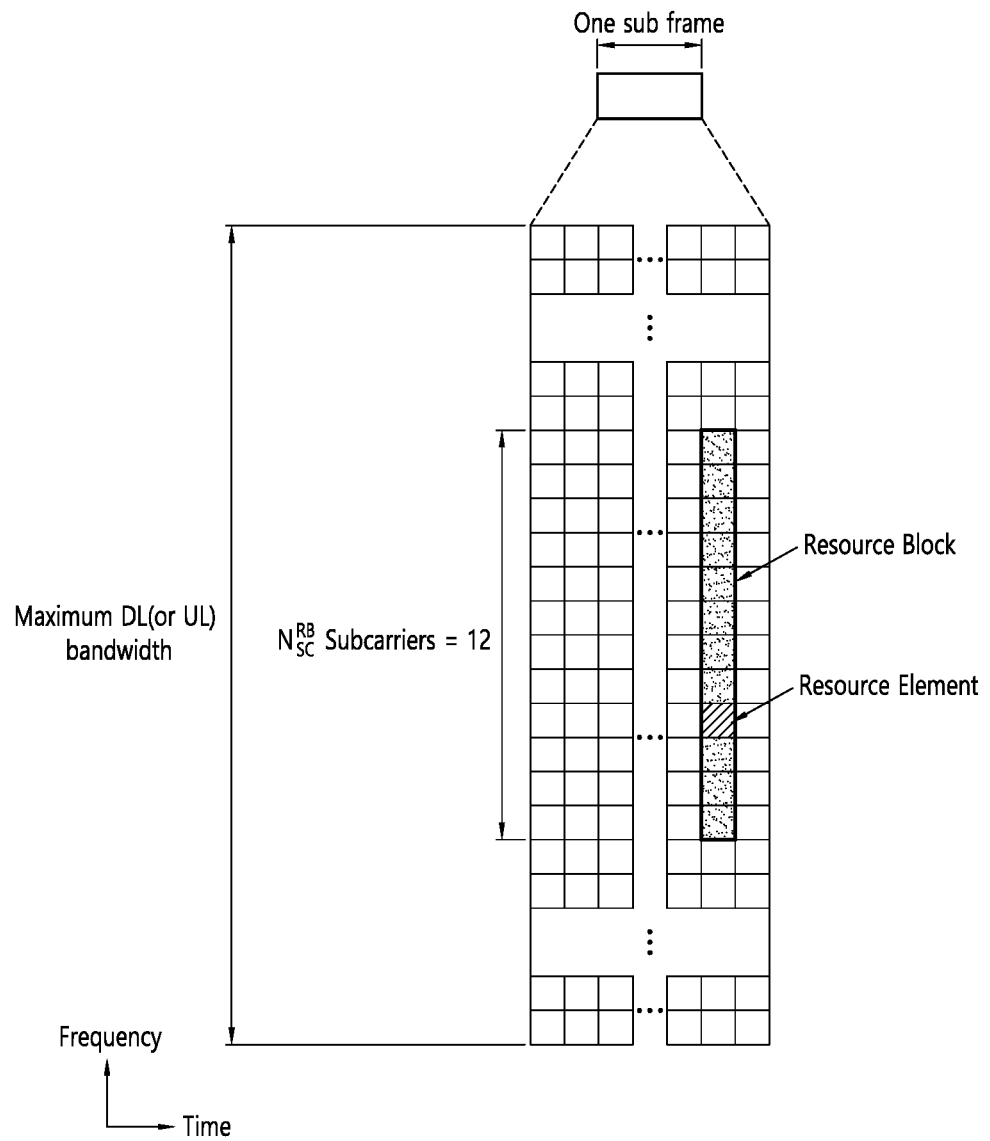
FIG. 5 is a drawing showing an example of a resource grid.

FIG. 5 is a drawing showing an example of a resource grid. The example of FIG. 5 is a time-frequency resource grid used in the NR standard. The example of FIG. 5 may be applied to uplink and/or downlink. As illustrated, a plurality of slots are included on a time axis in one subframe. Specifically, when expressed based on a value "$\mu$", "$14\times2^{\mu}$" symbols may be expressed in a resource grid. In addition, as illustrated, one resource block (RB) may occupy 12 contiguous subcarriers. One RB may be called a physical RB (PRB), and 12 resource elements (REs) may be included in each PRB. The number of RBs that can be allocated may be determined based on a minimum value and a maximum value. In addition, the number of RBs that can be allocated may be individually set based on a numerology "p", and may be set to the same value or different values for uplink and downlink.

Hereinafter, a cell search scheme performed in the NR standard will be described. A UE may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 6:
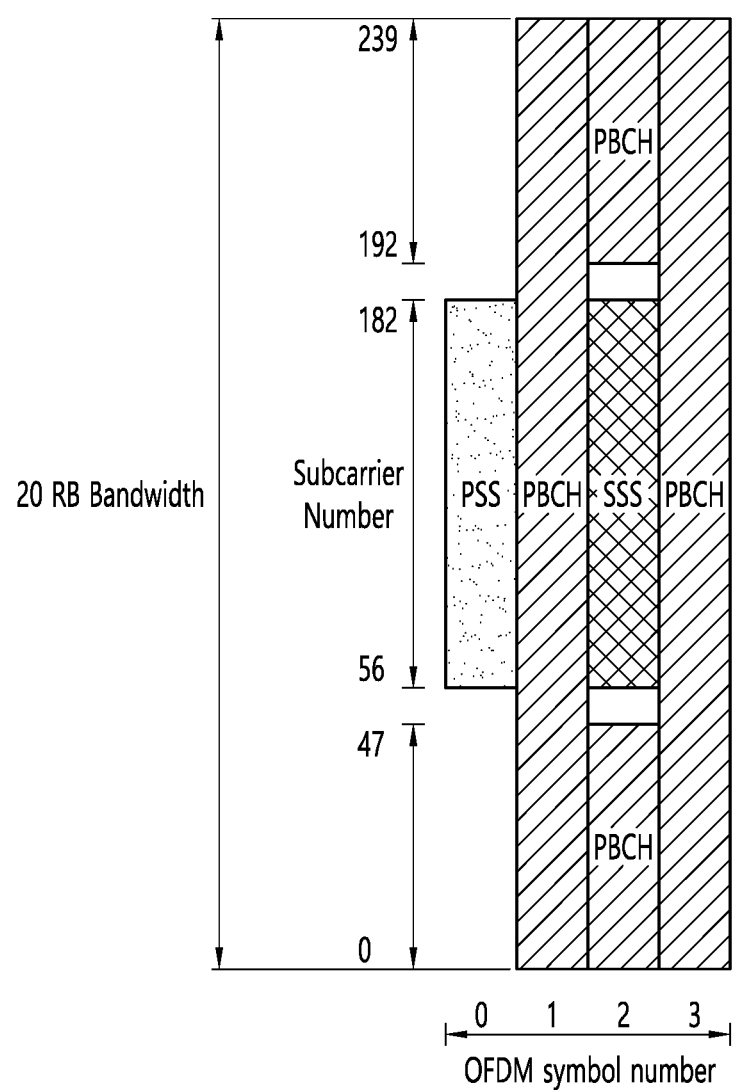
FIG. 6 shows an example of a synchronization channel applied to an embodiment of the present specification.

FIG. 6 shows an example of a synchronization channel applied to an embodiment of the present specification. As illustrated, a PSS and an SSS may include one symbol and 127 subcarriers, and a PBCH may be transmitted through 3 symbols and may include 240 subcarriers.

The PSS is used to obtain synchronization signal/PBCH block (SSB) symbol timing, and indicates three hypotheses for identifying a cell ID. The SSS is used to identify the cell ID, and indicates 336 hypotheses. As a result, 1008 physical cell IDs may be configured through the PSS and the SSS.

The SSB block may be transmitted repeatedly based on a predetermined pattern within a 5 ms window. For example, when L SSB blocks are transmitted, all of SSB #1 to SSB #L include the same information, but may be transmitted through beams of different directions. That is, a quasi co-location (QCL) may not be applied for the SSB blocks within the 5 m window. A beam used to receive the SSB block may be used in a subsequent operation (e.g., a random access operation or the like) between a UE and a network. The SSB block may be repeated with a specific period. A repetition period may be determined individually based on a numerology.

As illustrated, the PBCH has a bandwidth of 20 RBs in $2^{nd}/4^{th}$ symbols, and has a bandwidth of 8 RBs in a $3^{rd}$ symbol. A DM-RS for decoding the PBCH is included in the PBCH. A frequency domain is determined in the DMRS based on a cell ID value. Unlike in the LTE standard, since a cell-specific RS (CRS) is not defined in NR, a specific DM-RS is defined for demodulation of the PBCH. A PBCH-DMRS may include information indicating an SSB index.

The PBCH performs various functions, and may perform a function of representatively broadcasting a master information block (MIB). By reference, system information (SI) is divided into minimum SI (MSI) and other SI (OSI). The minimum SI may be divided again into MIB and system information type1 (SIB1), and the remaining minimum SI except for the MIB may be called remaining minimum SI (RMSI).

The MIB includes information required to decode the SIB1. For example, the MIB includes the SIB1 (a message ⅔ used in the random access procedure, a subcarrier spacing applied to other system information (SI)), a frequency offset between the SSB and an RB transmitted later, a bandwidth of PDCCH/SIB, and information for decoding the PDCCH (e.g., information on search-space/CORESET/DM-RS or the like described below). The MIB may be transmitted periodically, and the same information may be transmitted repeatedly for a time duration of 80 ms. The SIB1 is transmitted repeatedly through the PDSCH, and includes control information for initial access of the UE and information for decoding a different SIB.

Hereinafter, a sidelink or D2D operation to which an example of the present specification is applied will be described.

Figure 7:
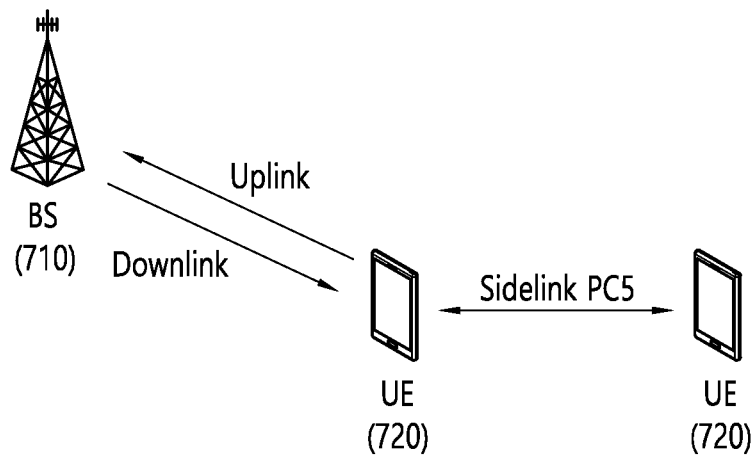
FIG. 7 is a drawing for a structure of sidelink to which an example of the present specification is applied.

FIG. 7 is a drawing for a structure of sidelink to which an example of the present specification is applied. As illustrated, uplink (UL) and downlink (DL) may be defined between a BS 710 and a UE 720. In addition, sidelink (SL) is defined between the UEs 720. The SL corresponds to a PC5 interface defined on the 3GPP standard. For example, a resource allocated to the SL may be selected from UL resources. Specifically, a subframe (or a time resource such as a slot or the like) on a UL frequency through FDD or a subframe (or a time resource such as a slot or the like) allocated on UL through TDD may be allocated.

The term "ProSe communication" may be used in the same concept as the SL. In general, the ProSe means an end-to-end application. The SL may mean a channel structure. Specifically, a structure for a physical/transport/logical channel or the like used for an air-interface to realize the ProSe application is described in general in the concept as the SL.

FIG. 8 is a drawing showing an example of a scenario to which sidelink is applied. As illustrated, sidelink (SL) or Prose communication may be divided into three scenarios. First, in an in-coverage scenario, a network (e.g., BS) may allocate a specific resource for sidelink (or ProSe) to a transmitting UE, or may allocate a resource pool (RP) that can be used by the transmitting UE. Second, an out-of-coverage scenario is a case where a network-based control is impossible. The transmitting UE may perform SL communication through a predetermined resource (e.g., a resource predetermined through USIM or UICC card or the like). Even in case of an out-of-coverage scenario, it may be an in-coverage situation for normal cellular traffic, and there may be no coverage only for ProSe communication. Finally, in a partial coverage scenario, an in-coverage UE and an out-of-coverage UE co-exist. Specifically, the out-of-coverage UE may use a predetermined resource, and the in-coverage UE may perform communication through a resource controlled by the network.

Figure 9:
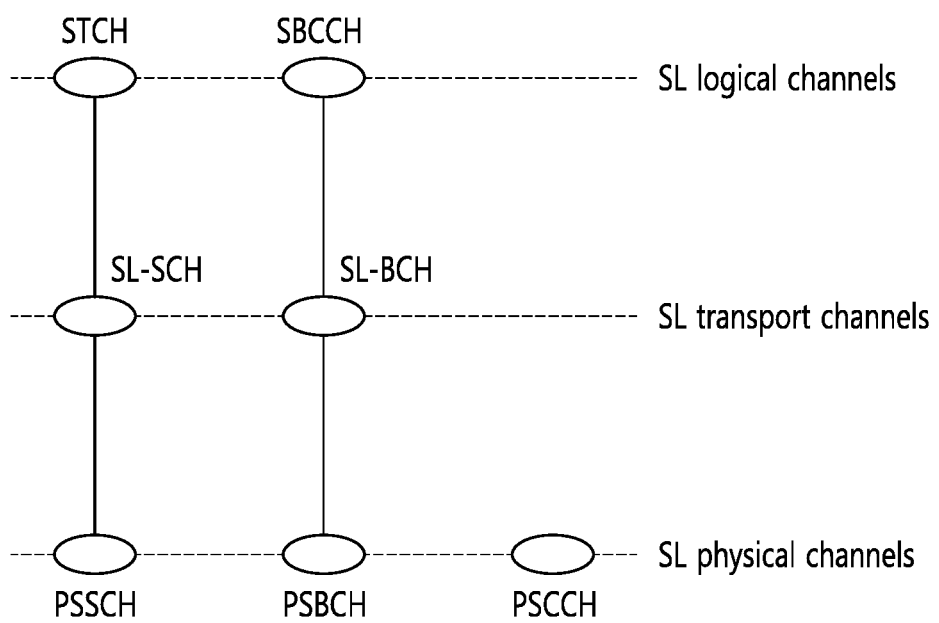
FIG. 9 is a drawing showing a mapping relation between channels related to sidelink.

FIG. 9 is a drawing showing a mapping relation between channels related to sidelink. A logical channel for the sidelink (SL) may be defined as an SL traffic channel (STCH) for a data path and an SL broadcast control channel (SBCCH) for control signaling. The STCH is used to transmit user information for a ProSe application, and is mapped to an SL shared channel (SL-SCH) and a physical DL shared channel (PSSCH). The SBCCH is used to transmit a control signal or the like for synchronization, and is mapped to an SL broadcast channel (SL-BCH) and a physical SL broadcast channel (PSBCH). A physical SL control channel (PSCCH) corresponds to a PDCCH of cellular communication. Specifically, the PSCCH is used to transmit sidelink control information (SCI) which is control information required to receive and demodulate the PSSCH. The SCI information is transmitted before an STCH data block is transmitted.

Figure 10:
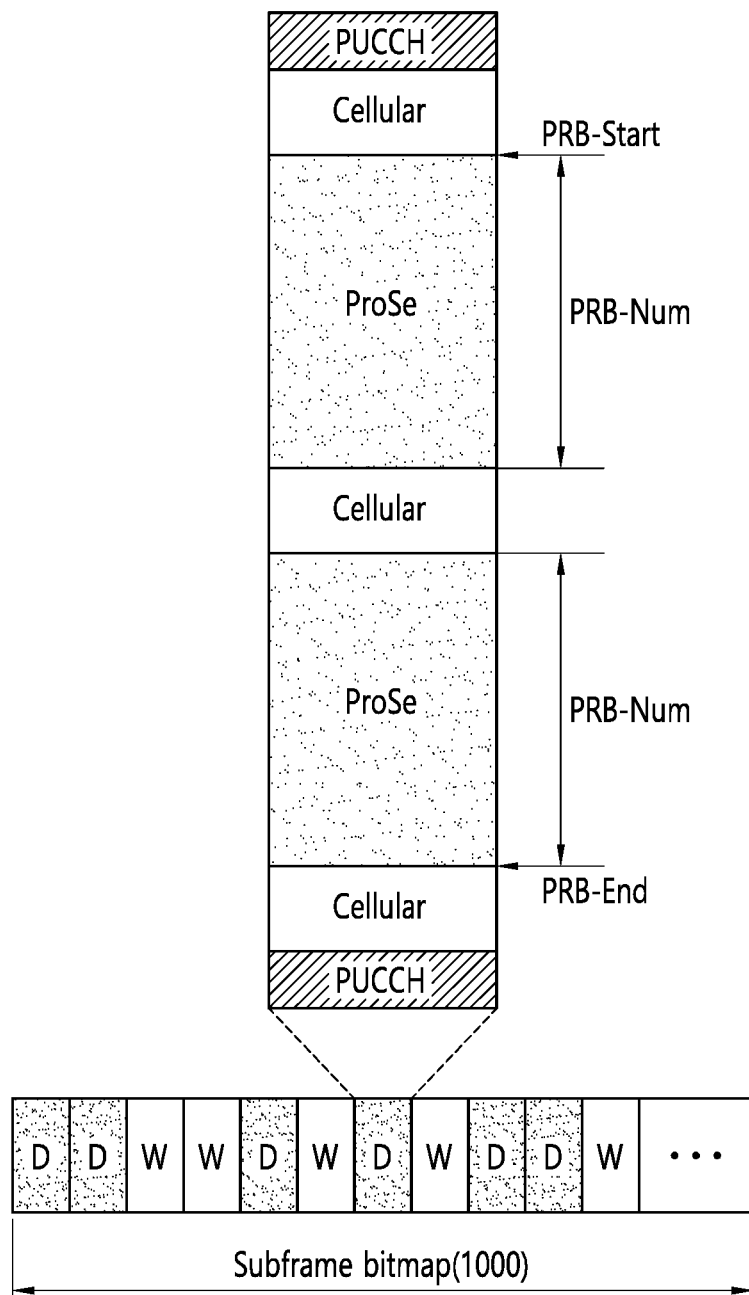
FIG. 10 shows an example of a resource pool for sidelink (SL) communication.

FIG. 10 shows an example of a resource pool for sidelink (SL) communication. The example of FIG. 10 shows an example in which a resource pool is configured on a subframe basis. However, the illustrated subframe may be replaced with another time unit (e.g., slot, symbol, or TTI). Based on the example of FIG. 10, whether a corresponding subframe is used for SL may be indicated depending on a subframe bitmap 1000. A pattern indicated depending on the subframe bitmap 1000 may be repeated.

Based on the example of FIG. 10, two frequency resources may be allocated for SL in one subframe, and each frequency resource may be indicated on a physical resource block (PRB) basis. Specifically, one frequency resource may start from PRB_start, and the other frequency resource may end at PRB end. The number of PRBs occupied by each of the frequency resources may be PRB-Num. One UE is configured to use any one of a resource for sidelink/ProSe communication and a resource for cellular communication. A resource pool (RP) for SL communication may be divided into RX RP and TX RP. Each RP may be signaled by a BS. All TX RPs may be connected to at least one RX RP.

An RP allocation method may be divided into a mode 1 and a mode 2. In the mode 1, a BS may indicate a resource in a specific RP. In the mode 2, a UE may select a specific RP, and may select a resource from an allocated resource pool set. For the mode 1, the UE shall be in an RRC connected state. However, the mode 2 may operate in an RRC idle state or an out-of-coverage state. Details thereof will be described with reference to FIG. 11.

Figure 11:
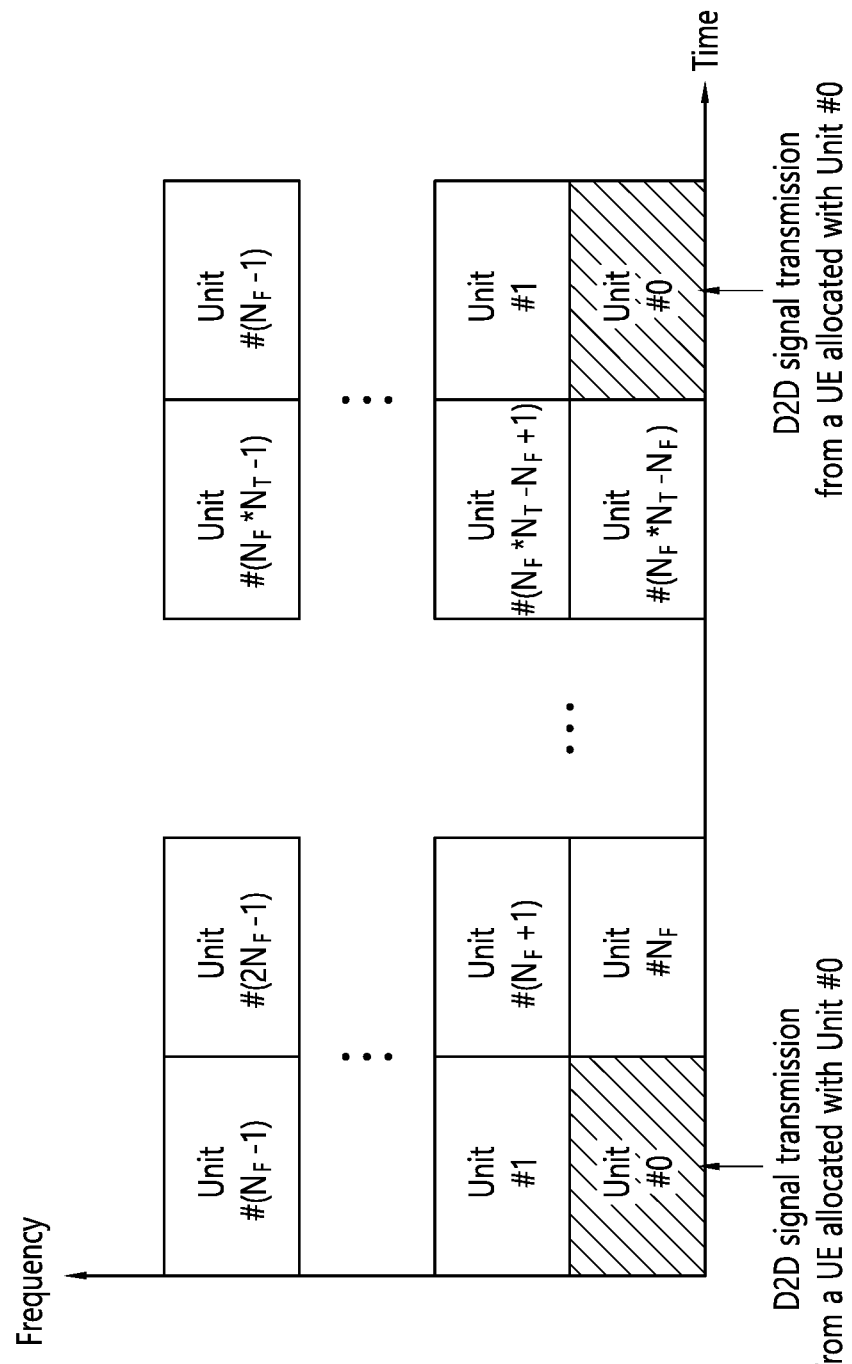
FIG. 11 shows another example of a resource pool for SL communication.

FIG. 11 shows another example of a resource pool for sidelink (SL) communication. The example of FIG. 11 may be used by a UE1 (i.e., transmitting UE) and UE2 (i.e., receiving UE) capable of performing communication through SL. In addition, when a network device such as an eNB transmits and receives a signal based on a communication scheme employed between UEs, the eNB may also be regarded as a kind of UE.

In the following description, the UE1 (transmitting UE) may operate to select a resource unit corresponding to a specific resource within a resource pool (RP) and to transmit a sidelink/D2D signal by using the corresponding resource unit. The UE2 (receiving UE) is configured for an RP to which the UE can transmit a signal, and detects the signal of the UE within the corresponding RP. If the UE1 is located within coverage of an eNB (i.e., in-coverage case), the RP may be informed by the eNB. On the other hand, if the UE is located outside the coverage of the eNB (i.e., a partial coverage or out-of-coverage case), the RP may be informed by another UE or may be determined as a predetermined resource. In general, the RP consists of a plurality of resource units, and each UE may select one or more resource units to transmit its sidelink/2D signal.

FIG. 11 shows an example of a resource unit. Herein, the entire frequency resource is divided into N_F units, and the entire time resource is divided into N_T units, and thus the total number of resource units is N_F*N_T. In other words, it may be assumed that an RP of FIG. 11 is repeated with a period of N_T subframes (or other time units). That is, one resource unit may be repeated periodically as shown in FIG. 11. Alternatively, in order to obtain a diversity effect in the time and/or frequency dimension, an index of a physical resource unit to which one logical resource unit is mapped may vary based on a predetermined pattern as time elapses. In this situation, an RP for sidelink/D2D communication may imply a set of resource units which may be used for transmission by a UE (i.e., transmitting UE) intending to transmit a sidelink/D2D signal.

The aforementioned RP may be subdivided into various types. First, the RP may be classified into various types based on content of a sidelink/D2D signal transmitted in each RP. For example, the content of the D2D signal may be divided as shown below, and a separate RP (i.e., individual or different RP) may be configured for each case.

Content Example #1: Scheduling Assignment (SA) or Sidelink/D2D Control Channel

A control channel described herein is used for a signal including a resource position of a sidelink/D2D data channel transmitted by each transmitting UE in the same or succeeding time unit (e.g., subframe, TTI, slot, symbol) and control information (e.g., at least any one of MCS, MIMO transmission scheme, information element such as timing advance or the like) required to demodulate a corresponding data channel. The aforementioned signal can be transmitted together with the sidelink/D2D data by being multiplexed on the same resource unit. In this case, an SA resource pool means a pool for a resource on which SA is transmitted by being multiplexed with the sidelink/D2D data. An SA control channel may be called a sidelink/D2D control channel or the like. The SA may correspond to the PSCCH described in FIG. 9.

Content Example #2: Sidelink/D2D Data Channel

An individual resource pool (RP) may be allocated for a sidelink/D2D data channel through which a transmitting UE transmits user data by using a resource designated through scheduling assignment (SA). The sidelink/D2D data channel may correspond to the PSSCH described above in FIG. 9. If it can be transmitted together with sidelink/D2D data by being multiplexed on the same resource unit, a resource pool (RP) for the sidelink/D2D data channel may be configured to transmit only the sidelink/D2D data channel configured by excluding SA information. In other words, a resource element used to transmit SA information on an individual resource unit in an SA RP is still used in an RP of the sidelink/D2D data channel to transmit sidelink/D2D data.

Content Example #3: Discovery Channel

A transmitting UE transmits information such as its identity (ID) or the like so that a neighboring UE discovers the transmitting UE. A message used in this case is transmitted through a discovery channel or a physical sidelink discovery channel (PSDCH). An individual resource pool (RP) may be allocated for a corresponding channel.

Even if the aforementioned D2D signal carries the same content, a different resource pool (RP) may be utilized depending on a transmission and reception attributes of the D2D signal. For example, even if the same sidelink/D2D data channel or the same discovery message is transmitted, the RP may be further divided into another different RP depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), a resource allocation scheme (for example, whether a transmission resource of an individual signal is allocated by a BS to each individual transmitting UE or whether an individual transmitting UE selects an individual signal transmission resource by itself within the resource pool), a signal format (for example, the number of symbols occupied by each D2D signal in one subframe or the number of subframes used for transmission of one D2D signal), strength of a signal from the BS, or transmission power intensity of a D2D UE. As described above, a method in which the BS directly indicates a transmission resource of the transmitting UE in sidelink/D2D communication may be called the mode 1, and a method in which a transmission resource region is predetermined or in which the BS designates the transmission resource region and the transmitting UE directly selects a transmission resource may be called the mode 2. In case of D2D discovery, a case where the BS directly indicates a resource may be called a type 2, and a case where the UE directly selects a transmission resource from a predetermined resource region or a resource region indicated by the BS may be called a type 1.

Hybrid Beamforming

The aforementioned NR standard may process a transmit (TX) beam and a receive (RX) beam through a hybrid beamforming scheme. The hybrid beamforming is a combination of an analog beamforming scheme and a digital beamforming scheme.

FIG. 12 shows an example of the conventional analog beamforming scheme.

A sub-figure (a) of FIG. 12 shows an example of a transmitter based on the analog beamforming scheme. As illustrated, a baseband signal may be input to a modulator, and thereafter the signal may be split through a power divider. The split signal may be input to a plurality of phase modulators and power amps. Four antennas are included in the example of FIG. 12. A beamformer may generate a TX beam by adjusting power ak (k=1, 2, 3, 4) and phase wk (k=1, 2, 3, 4).

A sub-figure (b) of FIG. 12 shows an example of a receiver based on the analog beamforming scheme. As illustrated, a complex weight may be applied to each antenna on an antenna array. The complex weight may correspond to the power ak and the phase wk. A signal received from each antenna may be summed and thus generated in a form of an output signal.

FIG. 13 shows an example of the conventional digital beamforming scheme.

A sub-figure (a) of FIG. 13 shows an example of a transmitter based on the digital beamforming scheme. Based on the digital beamforming scheme, an amplitude/phase variation is applied for a digital signal. Unlike analog beamforming, the digital beamforming may configure an individual RF chain for each antenna element, thereby supporting a plurality of RF chains in proportion to the number of antenna elements in use.

A sub-figure (b) of FIG. 13 shows an example of a receiver based on the digital beamforming scheme. Based on the digital beamforming scheme, a signal received in the receiver is subjected to analog-digital (A/D) conversion and then input to a digital down converter (DDC) through an antenna. Thereafter, the signals are added, and a complex weight is applied thereto.

Figure 14:
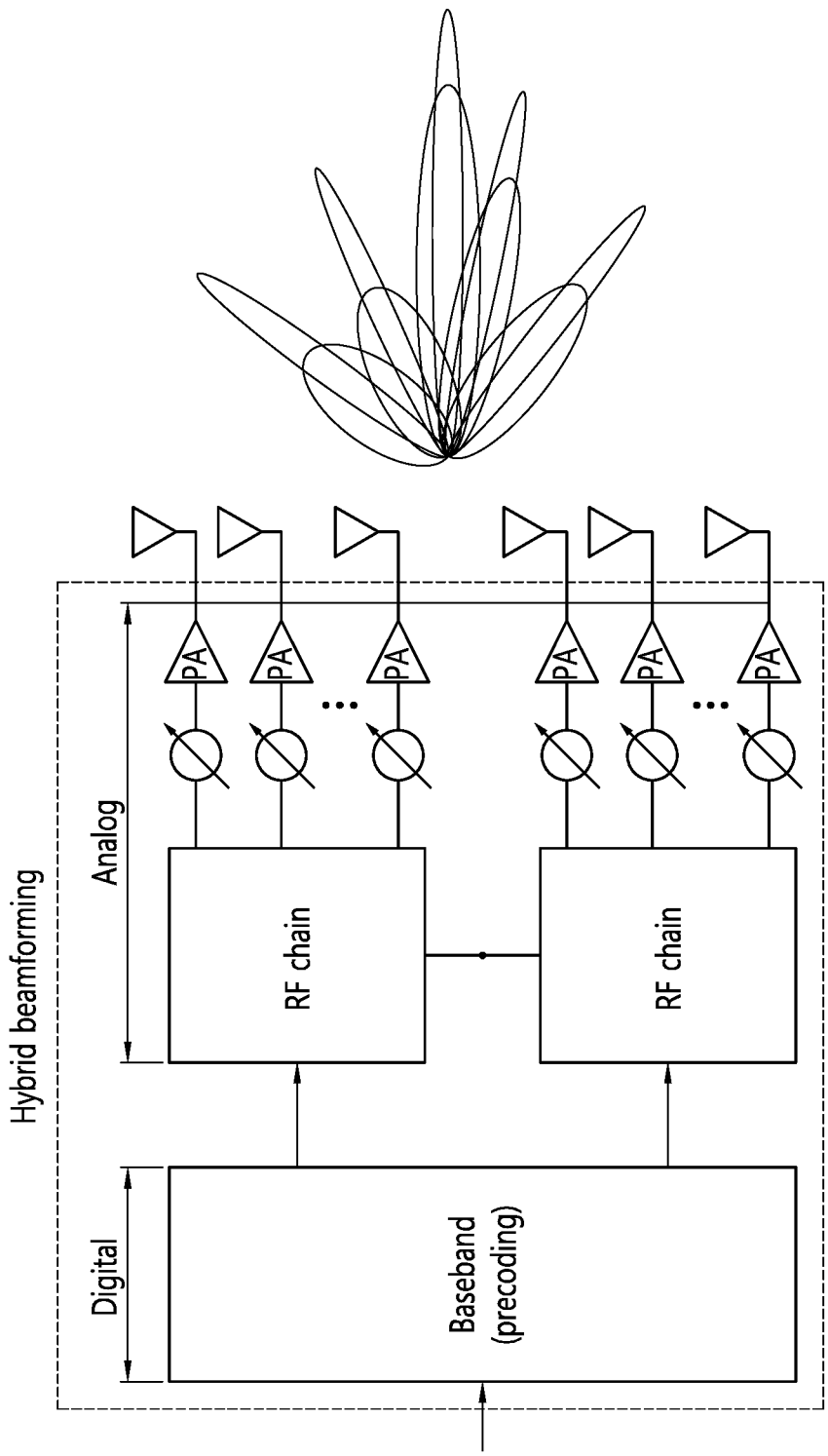
FIG. 14 shows an example of a transmitter based on a hybrid beamforming scheme applicable to the present specification.

FIG. 14 shows an example of a transmitter based on a hybrid beamforming scheme applicable to the present specification.

As illustrated, in a transmitter based on the hybrid beamforming scheme, a plurality of antenna elements may be mapped to one RF chain, rather than only one antenna element is mapped to all RF chains. Each antenna element may adjust a direction of a TX beam, i.e., an analog beam, through an analog phase shifter and a power amp (PA). As shown in FIG. 14, the hybrid beamforming scheme has a technical advantage in that complexity of a hardware configuration is decreased and power consumption is decreased.

Figure 15:
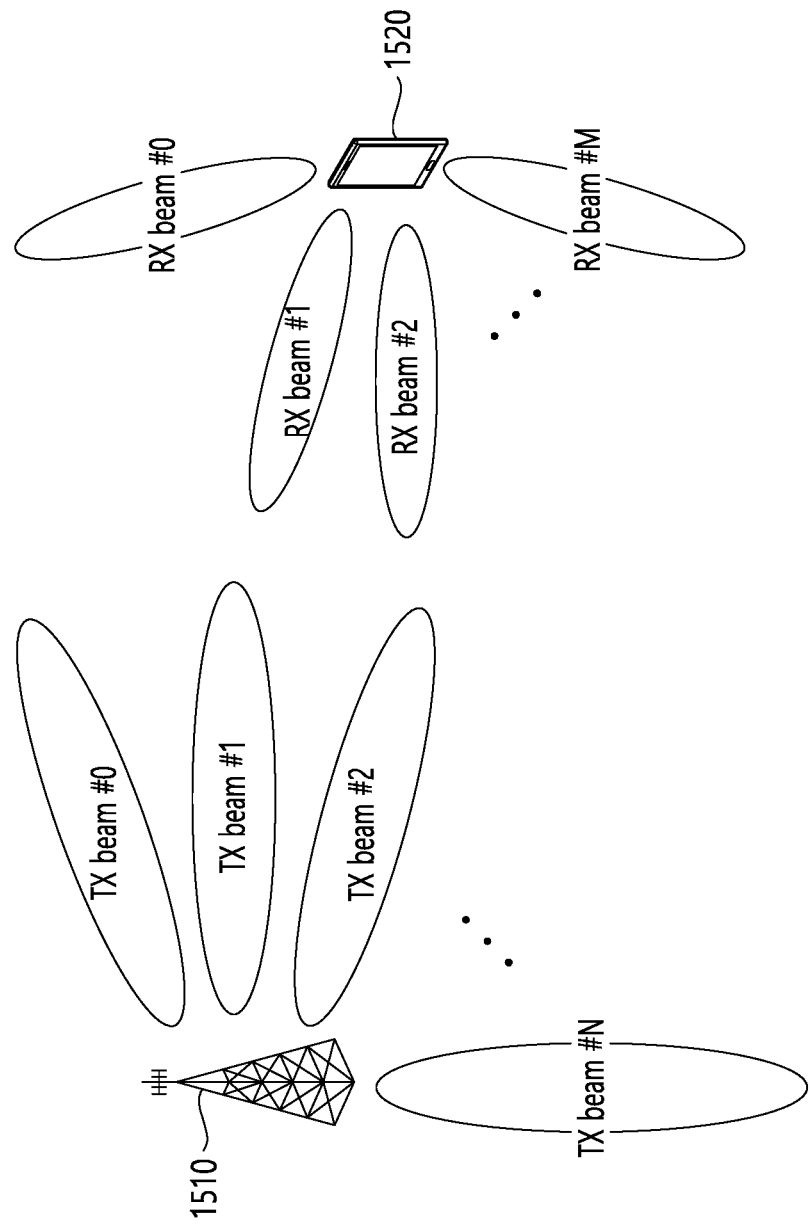
FIG. 15 shows the concept for a scheme of configuring a beam pair.

FIG. 15 shows the concept for a scheme of configuring a beam pair.

An example of FIG. 15 relates to an example in which a BS 1510 transmits a signal through a TX beam, and a UE 1520 receives a signal through an RX beam. However, it is also possible that the UE 1520 transmits the TX beam. In the following example, a TX beam/RX beam may mean a beam conforming to a hybrid beamforming scheme.

As illustrated, the BS 1510 may configure N+1 TX beams, and the UE 1520 may configure M+1 RX beams. In this case, an available beam pair may consist of (N+1)*(M+1) pairs in total, such as: i) TX beam #0 & RX Beam #0; ii) TX beam #0 & RX Beam #1; or iii) TX beam #0 & RX Beam #2. In this case, an optimal pair may be, for example, TX beam #1 & RX Beam #1 and TX beam #2 & RX Beam #2. When communication is performed through a TX/RX beam instead of pairing, reception performance may deteriorate.

A technical problem solved in the present specification is described as follows. An example of the present specification relates to a TX and/or RX beam paring for vehicle communication (or UE communication) in a millimeter wave (mmW) band.

Considering the use of an analog (or digital) beam in communication in the mmW band, a TX/RX beam pairing operation may be required. The TX/RX beam pairing may be used for a control channel or data channel transmitted/received based on pairing information. However, various technical problems may occur when an initial access process designed in the NR standard under discussion is applied to sidelink. That is, if control and/or data transmission are performed after beam paring is performed, a delay issue may occur in the sidelink. In addition, performing of beam pairing for all of a plurality of vehicles/UEs involved in communication is not efficient in terms of a resource overhead or power consumption of the UE.

Meanwhile, an initial access process in the NR standard includes both of: 1) a synchronization process; and 2) a TX/RX beam paring operation performed based on synchronization signals. Specifically, as described in FIG. 6, an SSB block is repeatedly transmitted based on a predetermined pattern through which the synchronization operation and the beam paring operation are performed together. More specifically, when a BS repeatedly transmits the synchronization signal (or SSB block) for each individual TX beam, the BS searches for an optimal TX beam in such a manner that a UE reports a measurement result of the synchronization signal to the BS. In addition, the BS repeatedly transmits the synchronization signal for each TX beam, and the UE searches for an optimal RX beam in such a manner that the UE measures repeated signals.

However, when an initial access process discussed in the NR standard, i.e., a technical feature for simultaneously performing synchronization and beam paring, is applied to sidelink, the following technical problem may occur. For example, in the NR standard, all UEs in one cell commonly perform beam pairing by using only a synchronization signal transmitted in one transmitter (i.e., one BS). However, in the sidelink, several neighboring transmitting UEs share the same frequency domain to efficiently use a resource. Such a feature applies to all of unicast, multicast, and broadcast data. Therefore, a synchronization signal commonly used by all neighboring UEs may be used in the synchronization process. However, since signal transmission through a plurality of TX beams for beam paring shall be performed for each transmitting UE, it may be difficult to directly use the initial access process of the NR standard in which a synchronization process is performed together with signal transmission through a plurality of TX beams for beam paring. In particular, in case of unicast data, signal transmission for each TX beam shall be performed for each transmitting/receiving UE pair. Since a pair of transmitting/receiving UEs may have a one-to-one or one-to-many relationship, an amount of resources may be significantly increased for the UE pair. Accordingly, it is necessary to consider a new TX/RX beam paring scheme by considering a situation where a plurality of transmitting-receiving UE pairs exist in the sidelink.

The present specification proposes a technical feature as follows for new TX/RX beam paring.

Specifically, the present specification proposes a TX/RX beam paring scheme using control information in a direct communication process between UEs through sidelink (or a communication process in a UE group) or a broadcast process for the sidelink. That is, a scheme of performing TX/RX beam paring using control information which is unicast data is proposed, instead of performing TX/RX beam paring using broadcast information such as a synchronization signal (e.g., SSB block) in the NR standard. That is, it is proposed a scheme of determining a combination of specific TX beam and RX beam (i.e., TX/RX beam pair) through a process of repeatedly transmitting/receiving control information. The control information may be control information for sidelink, and a specific example thereof will be described in the following embodiment.

Figure 16:
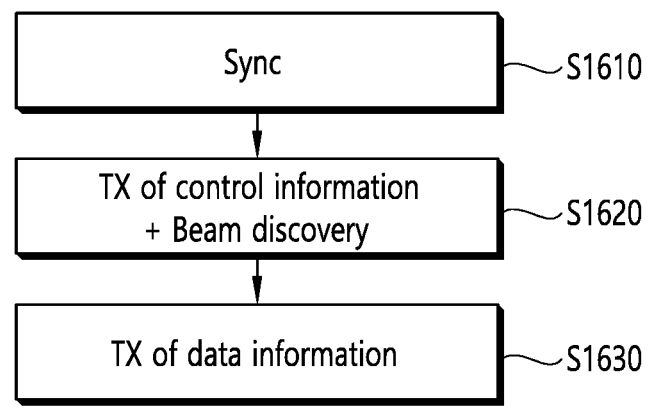
FIG. 16 shows a flowchart of a procedure applied to an example of the present specification.

The concept applied to the following embodiment will be illustrated as shown in FIG. 16. That is, FIG. 16 shows a flowchart of a procedure applied to an example of the present specification.

As illustrated, a beam paring method based on the present embodiment may be divided into three steps. As illustrated, it is divided into step S1610 in which synchronization is obtained for sidelink and step S1620 in which control information is transmitted and an optimal beam pair is searched. That is, in the NR standard, a BS repeatedly transmits a synchronization signal and beam paring is performed based on the repeatedly transmitted synchronization signal, whereas in the example of FIG. 16, the step S1610 of obtaining synchronization and the step S1620 of performing beam paring are performed separately. That is, a scheme is proposed in which, after synchronization is complete between transmitting/receiving UEs performing sidelink communication, control information is performed and TX/RX beam paring is performed at the same time.

Based on the following example, the control information of step S1620 may be repeatedly transmitted across several transmission time units (e.g., symbol, sub-frame, etc.) through a plurality of TX beams. Accordingly, the receiving UE may not only perform an operation of receiving control information but also know candidates of a TX/RX beam pair to be used in future data transmission (step S1630). The receiving UE may perform measurement and/or decoding on control information received through the beam pair candidates.

Figure 17:
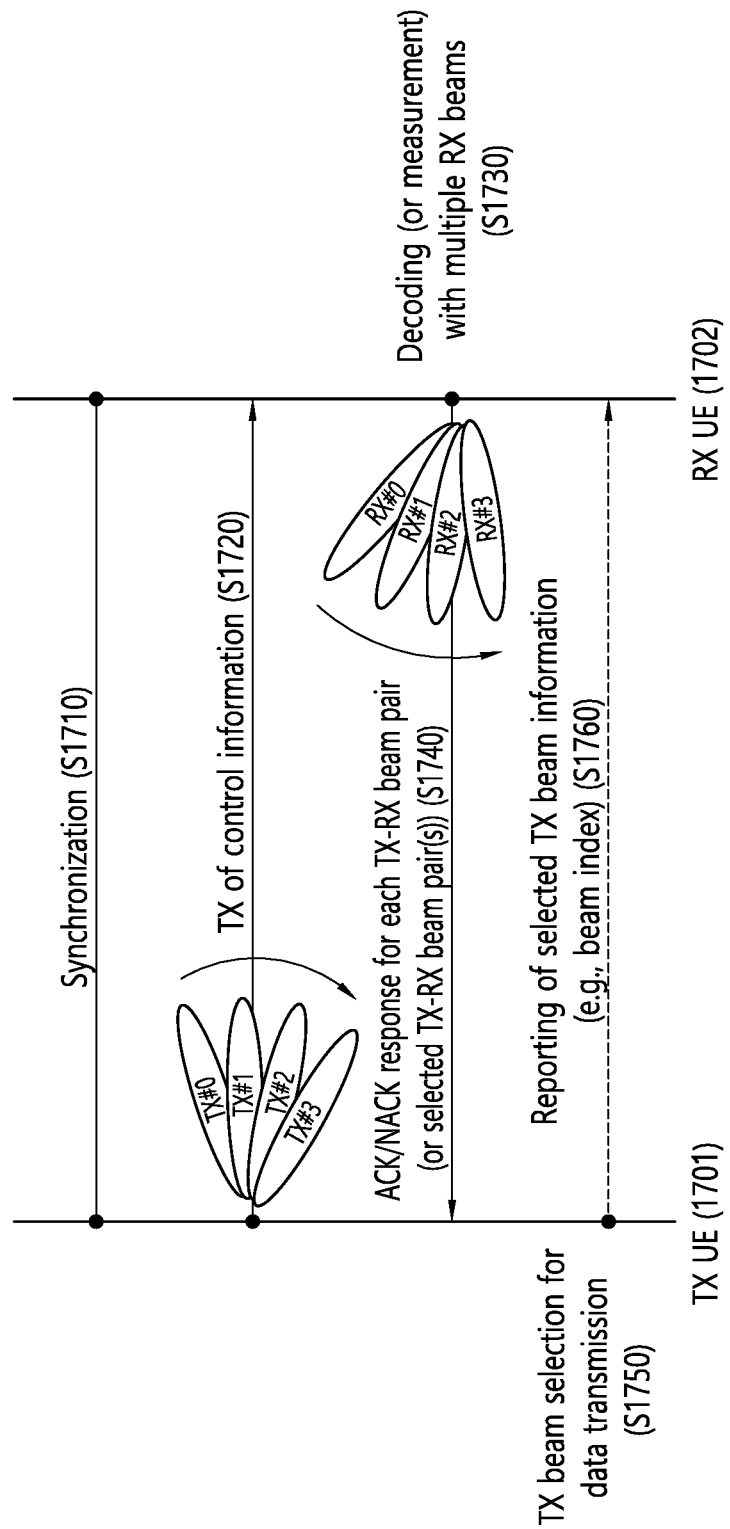
FIG. 17 is a specific procedural flowchart for an example of the present specification.

FIG. 17 is a specific procedural flowchart for an example of the present specification.

The example of FIG. 16 is specified in a greater detail in the example of FIG. 17. Among steps of FIG. 17, some steps (e.g., step S1760) may be omitted. For example, step S1710 may correspond to step S1610, and steps S1720 to S1760 may correspond to step S1620.

A transmitting UE 1701 and a receiving UE 1702 may transmit and receive signals through sidelink. For communication through the sidelink, each of the UEs 1701 and 1702 performs a procedure of obtaining synchronization (S1710). For example, each of the UEs 1701 and 1702 can obtain synchronization by receiving a synchronization signal from a specific UE (not shown), or can obtain synchronization by receiving a synchronization signal from a BS (not shown), or can obtain synchronization by receiving a synchronization signal from an additional entity (not shown). A more specific example for the procedure S1710 of obtaining synchronization will be described in a greater detail in an additional clause.

After the transmitting UE 1701 and the receiving UE 1702 obtain synchronization, the transmitting UE 1701 may transmit control information (S1720). The control information may be information for the sidelink. A specific example of the control information will be described in a greater detail in an additional clause. The transmitting UE 1701 which transmits the control information may transmit it to the receiving UE through the sidelink on the basis of a plurality of TX beams (S1720). For example, the transmitting UE 1701 may transmit the same control information through different TX beams during several time units (e.g., symbol, sub-frame, etc.). A specific example for step S1720 will be described in a greater detail in an additional clause.

The control information transmitted through step S1720 is transmitted to the receiving UE 1702 through a plurality of RX beams of the receiving UE 1702. That is, the receiving UE 1702 may receive the control information through the plurality of RX beams (S1730). The receiving UE 1702 may perform decoding on the control information received through the plurality of RX beams, or may perform measurement thereon (S1730). For example, the receiving UE 1702 may decode the received control information to determine whether it is ACK or NACK. Additionally or alternatively, the receiving UE 1702 may perform measurement on the received control information to measure/calculate/obtain quality or size (e.g., received signal strength indicator (RSSI), etc.) of an RX signal, and may compare it with a predetermined threshold.

Hereinafter, step S1740 will be described.

The receiving UE 1702 may select a preferred beam pair (i.e., a combination of at least one TX beam and at least one RX beam) through the received control information, and may transmit information on the selected pair to the transmitting UE 1701. Alternatively, the receiving UE 1702 may autonomously select a preferred RX beam, and may transmit control information to the transmitting UE 1701 so that the transmitting UE 1701 selects a proper TX beam. In this process, the receiving UE 1702 may transmit information on the RX beam selected by the receiving UE 1702 to the transmitting UE 1701. Alternatively, the receiving UE 1702 may provide control information required when the transmitting UE 1701 selects the preferred beam pair.

Hereinafter, all information related to a TX beam transferred by the receiving UE 1701 is called "TX beam information". The "TX beam information" may include information related to an RX beam together with the information on the TX beam, and may include information on a TX/RX beam pair. For example, the "TX beam information" may include ACK/NACK information on a specific (or all possible) beam pair, may include index information (or information on a size/quality of a signal received through a corresponding beam pair) indicating the specific (or all possible) beam pair, and may include index information indicating only a specific (or all possible) TX beam. That is, the "TX beam information" is information related to at least one of the plurality of TX beams, and optionally is information related to an RX beam or beam pair. Step S1704 is a step in which the aforementioned "TX beam information" is transferred.

Hereinafter, steps S1750 and S1760 will be described.

The transmitting UE 1701 may select a TX beam (or TX/RX beam pair) on the basis of the transferred "TX beam information" (S1750). The selected TX beam (or TX/RX beam pair) is used for subsequent communication performed after beam pairing (i.e., sidelink communication used to transmit and receive data and/or control information after the TX/RX beam is specified). The transmitting UE 1701 may transfer information on the selected beam (or beam pair) (e.g., index information indicating the selected beam) to the receiving UE 1702 (S1760). When the TX beam and/or RX beam to be used in subsequent communication by the transmitting UE 1701 and/or the receiving UE 1702 are specified/selected/determined, a beam paring operation or beam discovery ends, and thereafter subsequent communication (not shown) may be performed.

Specific features of the aforementioned steps S1710 to S1760 may be added or changed based on the following example. Hereinafter, the aforementioned steps S1710 to S1760 will be described in a greater detail.

Hereinafter, step S1710 will be described in a greater detail.

Figure 18:
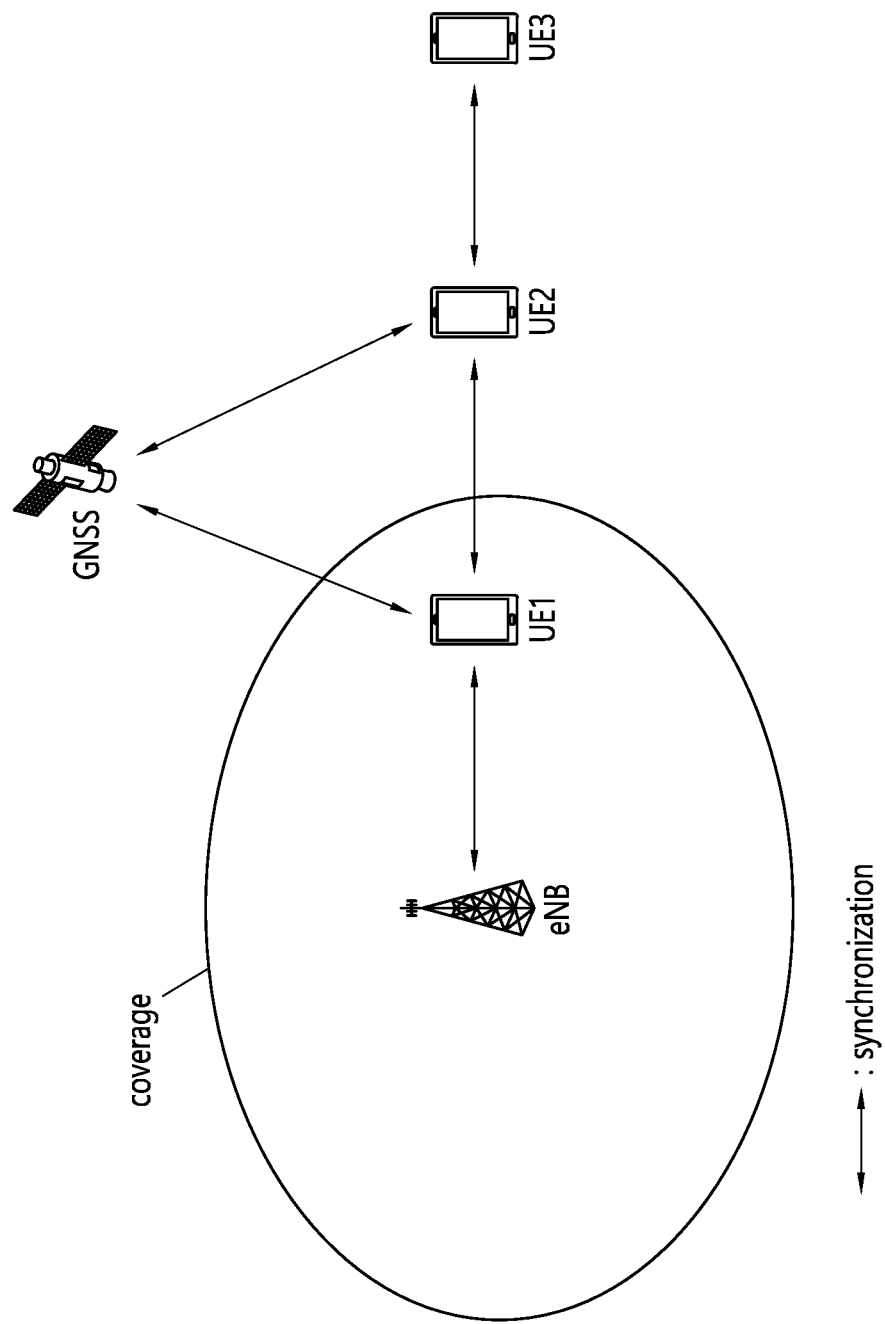
FIG. 18 is a drawing for explaining a procedure of performing synchronization performed in a user equipment.

FIG. 18 is a drawing for explaining a procedure of performing synchronization performed in a UE.

As an example of a synchronization signal for sidelink, a sidelink synchronization signal (SLSS) may be defined. A primary sidelink synchronization signal (PSSS) and a secondary sidelink synchronization signal (SSSS) are defined in the SLSS. Meanwhile, a physical SL broadcast channel (PSBCH) described in FIG. 9 is mapped to an SL broadcast control channel (SBCCH) for transmitting a control signal or the like for synchronization. The SLSS and the PSBCH may be transmitted together or separately.

A synchronization source for the sidelink may vary depending on a state of the UE. That is, the synchronization source may be set differently based on whether the UE is an in coverage (INC) UE or an out-of-coverage (OOC) UE. A specific example thereof is as follows.

Referring to FIG. 18, a UE1 is an INC UE of an eNB, and may directly receive a signal required for synchronization from the eNB and perform synchronization with the eNB. In this case, the eNB may be a synchronization reference for the UE1, and it may be expressed that the UE1 is directly synchronized with the eNB. In addition, the UE1 may directly receive a signal required for synchronization from a global navigation satellite system (GNSS) and thus may perform synchronization with the GNSS. In this case, the GNSS may be a synchronization reference for the UE1, and it may be expressed that the UE1 is directly synchronized with the GNSS. The UE1 may be synchronized with the eNB or the GNSS and thereafter may transmit an SLSS and/or a PSBCH for another UE.

A UE2 is an OOC UE of the eNB, and may directly receive a signal required for synchronization from the GNSS and perform synchronization with the GNSS. In this case, the GNSS may be a synchronization reference for the UE2. In addition, the UE2 may directly receive a signal required for synchronization from the UE1 and thus may perform synchronization. The UE2 may be synchronized with the GNSS or the UE1 and thereafter may transmit an SLSS and/or a PSBCH for another UE.

A UE3 is an OCC UE of the eNB, and may receive a signal required for synchronization from the UE2 to perform synchronization. The UEs 1, 2, and 3 may be sidelink UEs/V2X UEs supporting sidelink.

The OOC UE such as the UE2 may perform an SLSS(/PSBCH) transmission operation. For this, an SLSS(/PSBCH) resource may be configured. In this case, the OOC UE having a synchronization channel reference resource with respect to the GNSS may differently (or independently) configure(/signal): i) an SLSS(PSBCH) resource in which a PSBCH(/SLSS) is received from another UE (e.g., INC UE) and is relayed; and ii) an SLSS(/PSBCH) resource in which the OOC UE directly selects a GNSS synchronization reference and thereafter transmits the PSBCH(/SLSS), in a time domain. That is, an SLSS/PSBCH resource used when the UE2 receives the SLSS/PSBCH from the UE1 and transmits/relays it and an SLSS/PSBCH resource used when the SLSS/PSBCH is transmitted after performing synchronization with the GNSS may be differently or independently configured/signaled.

Since an example of the present specification performs beam pairing through control information defined separately from the aforementioned synchronization signal (e.g., SLSS/PSBCH), beam paring is not performed in such a manner that a synchronization signal (e.g., SLSS/PSBCH) for sidelink is repeatedly transmitted. In order to perform beam paring through the synchronization signal for sidelink as described above, the synchronization shall be transmitted through each TX beam for an available UE pair, which leads to a problem in that an amount of resources required for synchronization and beam paring is excessively increased. Therefore, as described above, in the example of the present specification, the synchronization operation and the beam paring operation are divided from each other, and beam paring is performed through the control information for sidelink instead of performing the beam paring through the synchronization signal.

Hereinafter, step S1720 will be described in a great detail. Based on step S1720, the transmitting UE 1701 may repeatedly transmit control information across several transmission time units (e.g., symbol, sub-frame, etc.) through a plurality of TX beams.

The control information repeatedly transmitted based on step S1720 may be: (1) the entirety or part of control information (e.g., the aforementioned PSCCH) required for subsequent sidelink communication; or (2) part of information (e.g., an RX ID capable of identifying a receiving UE) (required for beam pairing). For example, when the control information of step S1720 does not include the entirety of the PSCCH, the control information of step S1720 preferably includes part of information for beam paring. For example, sidelink control information (SCI) transmitted through the PSCCH includes the number of RBs of a radio resource (e.g., a resource pool of FIG. 10) for subsequent sidelink communication (communication performed on sidelink after beam pairing of FIG. 17), an RB position, a time resource pattern, a frequency hopping flag, modulation and coding scheme (MCS) information, timing advance (TA) for a receiving UE, information on transmitting/receiving UEs, or the like. The control information of step S1720 may include a variety of control information for sidelink communication, and preferably includes, for example, an ID of a transmitting UE, an ID of a receiving UE, and information for identifying a radio resource for receiving feedback information through step S1740.

If the control information of step S1720 includes only part of control information such as an ID of a transmitting/receiving UE and information of a radio resource for feedback, the rest of control information for subsequent sidelink communication (e.g., information not transferred in step S1720 among information included in the PSCCH) may be transmitted to the receiving UE 1702 after beam paring of FIG. 17 is performed. That is, the aforementioned rest of control information may be transmitted to the receiving UE 1702 by being multiplexed with user data in an FDM manner when subsequent sidelink communication is achieved or by being piggy-backed to a radio resource region not used for the user data. In case of using the FDM or piggy-back scheme, the control information of step S1720 preferably includes information (e.g., information on a position of a radio resource region to which additional control information is allocated) for decoding additional control information transferred through the FDM scheme or the piggy-back scheme.

The number of times of repeatedly transmitting the control information of step S1720 is preferably determined by considering the number of TX beams used in the transmitting UE 1710 (e.g., the number of TX beam candidates) and the number of RX beams used in the receiving UE 1702 (i.e., the number of RX beam candidates). For example, it may be assumed a case where the number of TX beam candidates that can be used by the transmitting UE 1701 is 4 (i.e., TX beams #0, #1, #2, and # are present), and the number of RX beam candidates that can be used by the receiving UE 1702 is 3 (i.e., RX beams #0, #1, and #2 are present). In this case, the control information of step S1720 may be repeatedly transmitted for each of 12 beam pairs. That is, one piece of control information may be repeatedly transmitted 12 times. Eventually, the total number of times of repeatedly transmitting the control information, i.e., the total time required to transmit the control information, is preferentially determined based on the number of TX beams and the number of RX beams. For example, if one time unit (e.g., 1 symbol) is allocated for one beam pair, 12 time units (e.g., 12 symbols) may be included to transmit the control information 12 times. Meanwhile, if an RX beam is an omni-directional beam having no directivity, the beam may be treated as one beam. As a result, the number of times of repeatedly transmitting the control information may be determined based on only the number of TX beams.

Assuming that there are 4 TX beams and 3 RX beams, while the control information of step S1720 is transmitted 12 times, the transmitting UE 1701 can transmit the same information repeatedly (i.e., 12 times). That is, the transmitting UE may transmit control information of the same content, but may transmit the control information of step S1720 by varying each TX beam only (i.e., by sequentially selecting TX beams #0, #1, #2, and #3). When the same control information is transmitted, it may be treated that a channel coding effect occurs. Therefore, when the same control information is repeatedly transmitted, the channel coding effect can be obtained through repeated transmission without having to perform additional channel coding. Of course, it is also possible that the transmitting UE 1701 does not transmit the control information of the same content. For example, it is also possible that the transmitting UE 1701 separately configures control information entirely repeated during transmission performed 12 times and control information only partially repeated.

In order to transmit the control information through step S1720, it is possible that the transmitting UE 1701 allows the control information to be included in a single codeword, and the single codeword is mapped to each TX beam. That is, it is possible that the control information is included in one codeword, and one codeword is transmitted through different TX beams.

Alternatively, it is also possible that the control information of step S1720 is transmitted through a plurality of codewords. For example, it is possible that the plurality of codewords are generated in such a manner that different redundancy versions (RVs) are applied for one piece of the same control information.

Figure 19:
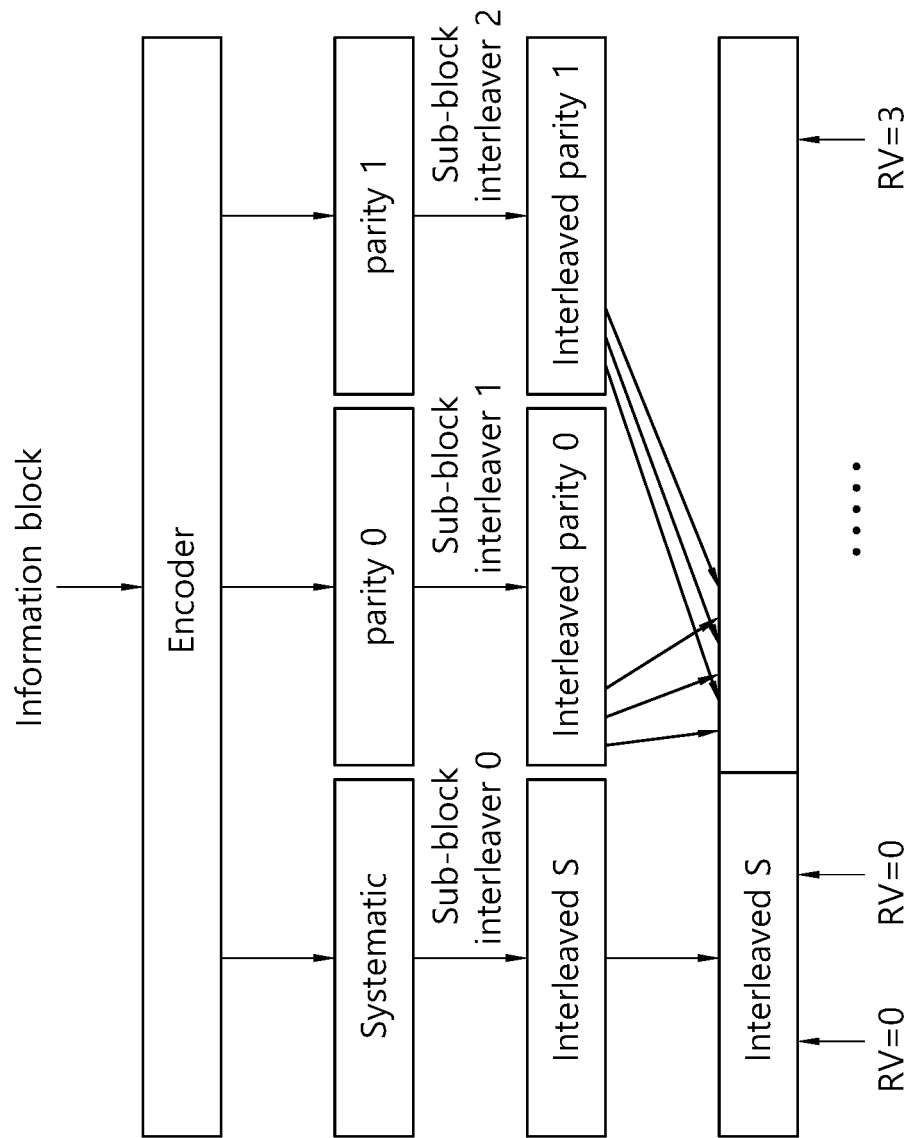
FIG. 19 shows an example of generating a plurality of codewords by applying different RBs for the same control information.

FIG. 19 shows an example of generating a plurality of codewords by applying different RBs for the same control information. As shown in FIG. 19, a point of generating an output bit-stream of an encoder and an interleaver varies depending on RV=0, RV=1, RV=2, RV=3, thereby generating different codewords, respectively. That is, a codeword (CW)#0 corresponding to RV=0 may be generated, and CW #1/#2/#3 corresponding to RV=1/2/3 may be generated. In this case, it is possible that CW #0/#1/#2/#3 are sequentially associated with/mapped to TX beam #0/#1/#2/#3. That is, a codeword to be mapped may be set differently for each TX beam (or TX beam group). Alternatively, it may be possible that the same codeword is transmitted through a different TX beam (or TX beam group) by differently applying a mapping scheme of the CW and TX beam. That is, it is possible that CW #0 is mapped to TX beams #0 and #1, and CW #1 is mapped to TX beams #2 and #3.

When the plurality of codewords are generated, it is preferable that the control information of step S1720 additionally includes information on RV applied to the control information. In this case, the receiving UE 1702 may apply RX combining with respect to control information having good RX signal quality (e.g., measured RX power is greater than or equal to a predetermined/signaled specific threshold value), to improve reception reliability.

Hereinafter, step S1730 will be described.

Through step S1730, the receiving UE 1702 may receive control information transmitted through step S1720, and may perform measurement and/or decoding thereon.

For example, the receiving UE 1702 may perform measurement on the received control information to measure/calculate/obtain quality or size (e.g., received signal strength indicator (RSSI), etc.) of an RX signal, and may compare it with a predetermined threshold. Such a measurement operation can be performed together with ACK/NACK determining described below or can be performed separately.

Meanwhile, the receiving UE 1702 may decode the received control information to decide whether it is ACK or NACK. The ACK/NACK decision may be performed for all TX/RX beam pairs (e.g., when 4 TX beams and 3 RX beams are used, ACK/NACK decision is performed for all of 12 pieces of control information), and may be performed for some of TX/RX beam pairs (e.g., ACK/NACK decision is performed only for a beam pair greater than or equal to a threshold based on a size/feature of an RX signal).

Hereinafter, step S1740 will be described.

Through step S1740, the receiving UE 1702 transmits "TX beam information" to the transmitting UE 1701. As described above, the "TX beam information" may include information on a TX beam, or may include information on a TX/RX beam pair.

Specifically, the "TX beam information" may include reporting information transmitted by the receiving UE 1702 to the transmitting UE 1701. For example, the "TX beam information" may include an ACK/NACK response including ACK/NACK information obtained after the receiving UE 1702 succeeds in decoding. Additionally or alternatively, the "TX beam information" may be a measurement value of some or all of TX/RX beam pairs for a case where RX signal quality is good and/or a case where RX signal quality is greater than or equal to a predetermined/signaled threshold. Additionally or alternatively, the "TX beam information" may include information (e.g., a beam pair index) for identifying some or all of TX/RX beam pairs for a case where RX signal quality is good and/or a case where RX signal quality (e.g., power) is greater than or equal to a predetermined/signaled threshold. Additionally or alternatively, the "TX beam information" may be information (e.g., a TX beam index) on one or a plurality of TX beams selected by the receiving UE 1702 on the basis of a measurement result.

In other words, the "TX beam information" may include reporting information for a TX beam or TX/RX beam pair corresponding to a result greater than or equal to a threshold (or all TX beams or TX/RX beam pairs irrespective of the threshold), and the reporting information may include, for example, ACK/NACK information, RX signal quality information, and/or index information. Meanwhile, the receiving UE 1702 may select at least one RX beam through steps S1730 and S1740, and may use the RX beam in subsequent communication, and may select an RX beam based on a TX/RX beam pair selected by the transmitting UE 1701 on the basis of the "TX beam information" reported through step S1740, and may use the RX beam in subsequent communication. In this process, the "TX beam information" may include information on a TX beam preferred by the receiving UE 1702.

Meanwhile, when the receiving UE 1702 reports the "TX beam information" to the transmitting UE 1701, the receiving UE 1702 may transmit it by applying an optimal RX beam selected by the receiving UE 1702 (or a beam group having at least specific RX signal quality (or a wide beam on which the RX beam is superposed)). Since such information on the RX beam cannot be known to the transmitting UE 1701, the RX beam or RX beam group may be repeatedly transmitted. (In this case, many time resources may be used, and to prevent this, an OFDM having a shorter time unit than a current symbol unit may be transmitted. Further, in this case, transmission with a subcarrier spacing different from a subcarrier spacing used in control or data transmission may be used.)

Hereinafter, steps S1750 and S1760 will be described.

On the basis of reporting information (i.e., "TX beam information") received from the receiving UE 1702 in step S1740, the transmitting UE 1701 may transmit information on a TX beam to be used by the transmitting UE 1701 in subsequent communication (or information on a TX/RX beam pair) to the receiving UE 1702 (case 1), or determine whether to use a preferred TX beam selected by the receiving UE 1701 and transmit a confirm message regarding whether to use the beam to the receiving UE 1702 (case 2).

In other words, on the basis of the "TX beam information", the transmitting UE 1701 may select a TX beam or TX/RX beam pair to be used in subsequent communication (S1750), and may transmit information on the selected TX beam or TX/RX beam pair to the receiving UE 1702 (S1760). In this process, step S1760 may be omitted. When step S1760 is omitted, it may be assumed in advance that subsequent communication is achieved with an optimal TX beam reported by the receiving UE 1702, or signaling regarding whether the assumed operation will be used in practice may be transferred to the receiving UE 1702.

An example of the aforementioned steps S1720 to S1760 may be performed by considering the following aspects.

First, all of steps S1720 to S1760 may be performed within one time unit (e.g., a subframe, TTI, short TTI conforming to the conventional LTE standard or one TTI, short TTI, slot, mini slot defined based on the NR standard). For example, when steps S1702 to S1760 are performed in an N-th time unit, subsequent communication (i.e., sidelink data communication between UEs) may be performed in an (N+1)-th time unit. Alternatively, when steps S1702 to S1750 are performed within one time unit (e.g., an N-th subframe/slot/short TTI/mini slot/TTI), and step S1760 and subsequent communication may be performed in a next time unit (e.g., an (N+1)-th subframe/slot/short TTI/mini slot/TTI).

Figure 20:
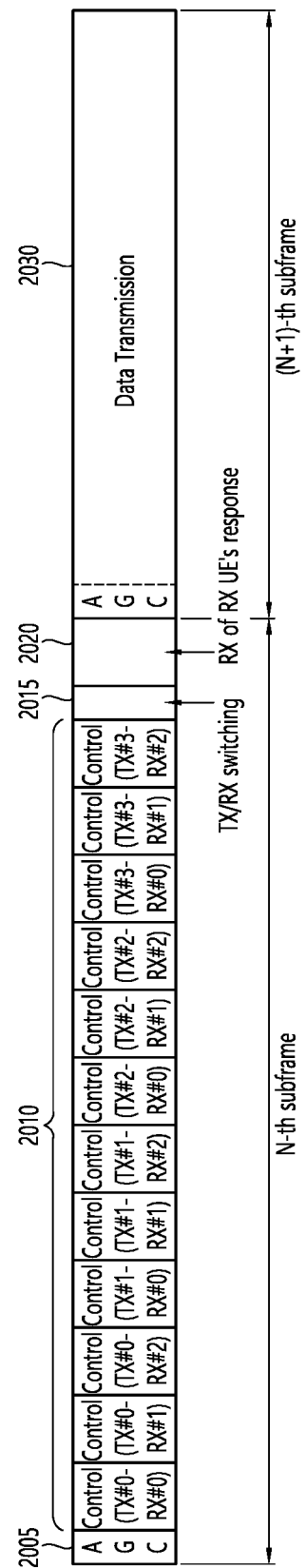
FIG. 20 is a drawing showing an example of a time unit used in an example of the present specification.
Figure 21:
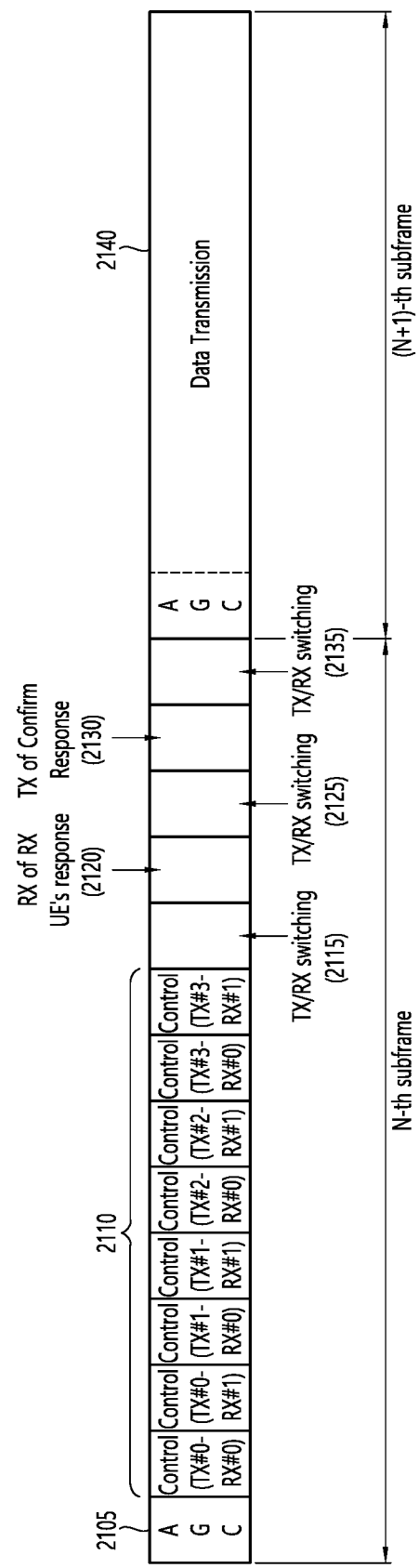
FIG. 21 is a drawing showing another example of a time unit used in an example of the present specification.

Meanwhile, the aforementioned S1720 and S1760 may operate based on an example of FIG. 20 or FIG. 21. The example of FIGS. 20/21 may be implemented based on various time units. However, for convenience of explanation, related features are described based on subframe and symbol units. The subframe used in FIGS. 20/21 may be a time unit conforming to the LTE or NR standard, but may be a time unit of which a length is increased or decreased, compared to a time unit of the conventional standard.

FIG. 20 is a drawing showing an example of a time unit used in an example of the present specification. The time unit of FIG. 20 may be based on a subframe, and a sub-unit in the subframe may be a symbol (or a half symbol, 1/n symbol).

Specifically, an N-th subframe of FIG. 20 includes a first part 2010 and a second part 2020. More specifically, the N-th subframe of FIG. 20 includes a control symbol 2005 for automatic gain control (AGC), the first part 2010 contiguous to the control symbol 2005, a TX/RX switching part 2015 contiguous to the first part 2010, and the second part 2020 contiguous to the TX/RX switching part 2015. The aforementioned steps S1720 to S1740 are performed through the N-th subframe of FIG. 20, and subsequent communication is performed through the (N+1)-th subframe 2030 of FIG. 20. In the example of FIG. 20, an example in which one subframe is implemented through 14 symbols is illustrated. For example, in the example of FIG. 20, a ½ symbol (half symbol) is allocated for the AGC 2005, 12 symbols are allocated for the first part 2010, the TX/RX switching part 2015 consists of the ½ symbol (half symbol), and the second part 2020 consists of one symbol.

As illustrated, each symbol (or 1/n symbol) of the first part 2010 is allocated to a combination (i.e., a specific TX/RX beam pair) of one of the plurality of TX beams and one of the plurality of RX beams. In addition, the number of symbols included in the first part 2010 may be determined based on the number of the plurality of TX beams (e.g., 4) and the number of the plurality of RX beams (e.g., 3). In the example of FIG. 20, 12 symbols (or 1/n symbol) are included in the first part 2010.

The illustrated first part 2010 is a time unit for performing the aforementioned steps S1720 and S1730. Through the time unit, the transmitting/receiving UE may transmit/receive control information through a plurality of TX beams and a plurality of RX beams. The illustrated TX/RX switching part 2015 may be implemented with, for example, ½ symbol, and is a time duration for RX/TX switching. The illustrated second part 2020 is a time unit for performing the aforementioned step S1740.

Although the illustrated (N+1)-th subframe 2030 includes a control symbol for AGC (e.g., implemented with ½ symbol), if the receiving UE 1702 utilizes an AGC result through the N-th subframe, the control information may be omitted.

Subsequent communication is performed through the (N+1)-th subframe 2030. A TX/RX beam obtained/determined/selected through beam paring/discovering may be utilized to perform subsequent communication (i.e., sidelink data communication).

FIG. 21 is a drawing showing another example of a time unit used in an example of the present specification. The time unit of FIG. 21 may be based on a subframe, and a sub-unit in the subframe may be a symbol (or a half symbol, 1/n symbol).

Specifically, an N-th subframe of FIG. 21 includes a first part 2110, a second part 2120, and a third part 2130. More specifically, the N-th subframe of FIG. 21 includes a control symbol 2105 for Automatic Gain Control (AGC), the first part 2110 contiguous to the control symbol 2105, a first TX/RX switching part 2115 contiguous to the first part 2110, the second part 2120 contiguous to the first TX/RX switching part 2115, a second TX/RX switching part 2125 contiguous to the second part 2120, the third part 2130 contiguous to the second TX/RX switching part 2125, and a third TX/RX switching part 2135 contiguous to the third part 2130. For example, FIG. 21 is an example in which one symbol 2105 is allocated for AGC, 8 symbols are allocated for the first part 2110, each of three TX/RX switching parts 2115, 2125, and 2135 consists of one symbol, and each of the second/third parts consists of one symbol.

The aforementioned steps S1720 to S1760 are performed through the N-th subframe of FIG. 21, and subsequent communication is performed through the (N+1)-th subframe 2140 of FIG. 21. In the example of FIG. 21, an example in which one subframe is implemented through 14 symbols is illustrated.

As illustrated, each symbol (or 1/n symbol) of the first part 2110 is allocated to a combination (i.e., a specific TX/RX beam pair) of one of the plurality of TX beams and one of the plurality of RX beams. In addition, the number of symbols included in the first part 2110 may be determined based on the number of the plurality of TX beams (e.g., 4) and the number of the plurality of RX beams (e.g., 2). In the example of FIG. 21, 8 symbols (or 1/n symbol) are included in the first part 2110.

The illustrated first part 2110 is a time unit for performing the aforementioned steps S1720 and S1730. Through the time unit, the transmitting/receiving UE may transmit/receive control information through a plurality of TX beams and a plurality of RX beams. The illustrated first to third TX/RX switching parts 2115, 2125, and 2135 may be implemented with, for example, ½ symbol, and is a time duration for RX/TX switching. The illustrated second part 2120 is a time unit for performing the aforementioned step S1740, and the illustrated third part 2130 is a time unit for performing the aforementioned step S1760.

Although the illustrated (N+1)-th subframe 2140 includes a control symbol for AGC (e.g., implemented with ½ symbol), if the receiving UE 1702 utilizes an AGC result through the N-th subframe, the control information may be omitted.

Subsequent communication is performed through the (N+1)-th subframe 2140. A TX/RX beam obtained/determined/selected through beam paring/discovering may be utilized to perform subsequent communication (i.e., sidelink data communication).

An example of the illustrated TX/RX beam pair in the aforementioned first parts 2010 and 2110 may be modified. In addition, as described above, not all steps S1720 to S1760 (or step S1740) are necessarily performed in an N-th time unit (e.g., subframe), and some of the steps may be performed in an (N+1)-th unit (or another time unit). That is, as described above, step S1740 and/or step S1760 can be performed in the (N+1)-th time unit (or another time unit).

Hereinafter, an additional technical feature will be described for the aforementioned example.

An example of the present specification proposes a method of repeatedly performing transmission through multiple beam sweeping for control information transmitted through the aforementioned step S1720 or the like. In addition, the present specification proposes a method of transmitting subsequent data through a TX/RX beam pair determined based on multiple beam sweeping. However, the example of the present specification may be variously modified. For example, the proposed example may be applied to an HARQ retransmission scheme. For example, the example of the present specification may perform repeated transmission through multiple beam sweeping for initial data transmission, and may also be applied when a determined TX/RX beam is used in ACK/NACK response transmission of the receiving UE 1702 (example 1) and/or is used in retransmission of the transmitting UE 1701 (example 2).

A case of the example 1 is preferably applied when channel reciprocity is established. In addition, a case of the example 2 may be applied when transmission through beam sweeping is performed in initial transmission, but the receiving UE 1702 fails to receive data for transmission through any TX/RX beam pair. In this case, the receiving UE 1702 may indicate TX beam information to be used in retransmission by the transmitting UE 1701 in such a manner that TX/RX beam pair information having relatively good RX signal quality (or preferred by the receiving UE) and/or TX beam information are fed back together on a NACK response to the transmitting UE. In this case, the TX/RX beam pair information and/or TX beam information to be used in retransmission may be transmitted by allocating an additional bit to the ACK/NACK response, or may be transmitted in a sequence form on the ACK/NACK response.

Based on an example of the present specification, when PSBCH (and/or SLSS) transmission is performed for each TX beam, for optimal beam selection(/pairing), the receiving UE 1702 may select only a beam in which PSBCH decoding is successful (and/or a beam of an SLSS RX power level greater than or equal to a predetermined(/signaled) threshold) as a candidate. Additionally or alternatively, for optimal beam selection(/pairing), the receiving UE 1702 may consider only a beam that can be fed back/transmitted in the future within its power budget as a candidate. In other words, the aforementioned rule/feature may be effective when TX power based on beam-specific reference signal (or channel) measurement (e.g., pathloss) is determined. When the rule is applied, optimal beam selection considering not only reception performance but also further feedback performance may be possible.

Meanwhile, considering a unicast or multicast situation based on sidelink, beam-specific RS transmission may not be guaranteed in a wireless communication system. In other words, upon receiving the beam-specific RS, even if RX signal power measured in a certain UE is high (relatively compared to that of an RS for another beam), the UE may be only a UE adjacent to a receiving UE of unicast/multicast communication, and may not be a UE for receiving data through a corresponding link. Therefore, in order to prevent an unnecessary (wrong) operation of UEs adjacent to the receiving UE, information that can be CRC-checked (e.g., SCI and/or data) may be transmitted together with the beam-specific RS, and an operation of not selecting a corresponding RS in case of a CRC check failure may be considered together.

An example of the present disclosure can achieve the following technical advantage. The example of the present disclosure proposes a method of performing a beam pairing operation through a sidelink-specific control signal which is distinct to a synchronization signal (e.g., PSBCH and/or SLSS). If an optimal TX beam and RX beam are selected in such a manner that the synchronization signal is repeatedly transmitted, the synchronization signal is repeatedly transmitted based on paring of each transmitting/receiving UE, which leads to a significant waste in a radio resource for transmitting the synchronization signal. However, in the example of the present description, beam pairing is performed based on a control signal corresponding to unicast transmission, separately from a synchronization operation.

Therefore, a problem of repeatedly transmitting the synchronization signal for beam pairing can be solved. In addition, since the example of the present specification proposes a procedure optimized for TX/RX beam pairing, there is a technical advantage in that beam pairing can be effectively performed on sidelink. In addition, since an effective arrangement of a time unit (e.g., a symbol/subframe) is proposed for beam paring, there is a technical advantage in that beam paring can be effectively performed in a situation where a plurality of TX/RX beams are present on sidelink.

Hereinafter, an example of the present specification shows an example of a UE (TX or receiving UE).

Figure 22:
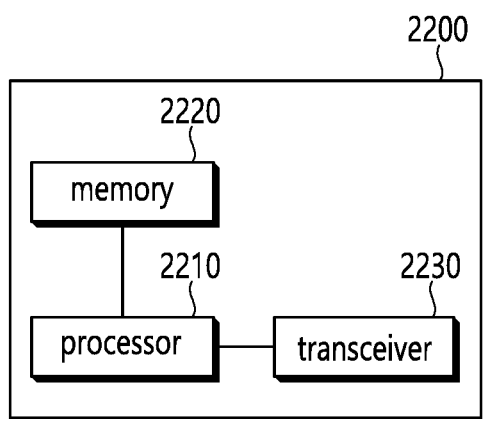
FIG. 22 shows an example of a user equipment to which an example of the present specification is applied.

FIG. 22 shows an example of a UE to which an example of the present specification is applied.

Referring to FIG. 22, a UE 2200 includes a processor 2210, a memory 2220, and a transceiver 2230. The illustrated processor, memory and transceiver may be implemented as separate chips, or at least two blocks/functions may be implemented through a single chip.

The illustrated transceiver 2230 performs an operation of transmitting and receiving signals. Specifically, to form a TX or RX beam through hybrid beamforming, the transceiver may include a constitutional element of the beamformer shown in FIG. 12 to FIG. 14.

The processor 2210 may implement the functions, processes and/or methods proposed in this specification. The processor 2210 may perform an operation based on the above description. The processor 2210 may include application-specific integrated circuits (ASIC), other chipsets, logic circuits, and data processors. The memory 2220 may include a read-only memory (ROM), a random access memory (RAM), a flash memory, a memory card, a storage medium and/or other storage devices.

The processor 2210 preferably includes a plurality of processing blocks (not shown). For example, the processor may include a data processor and a TX/RX beamformer controller. Specifically, the data processor may decode control information such as a PSCCH to obtain information on a resource pool (RP), or may perform data processing to transmit control information such as a PSCCH. The TX/RX beamformer controller controls the transceiver 2230 to transmit the control information by using a plurality of TX beams in the aforementioned step S1720. In addition, the TX/RX beamforming controller controls the transceiver 2230 to receive the control information by using a plurality of RX beams in the aforementioned step S1730. That is, the data processor and the TX/RX beamforming controller are coupled to the transceiver 2230 to perform an operation of repeatedly transmitting and receiving control information by using a plurality of TX/RX beams.

An apparatus based on an example of the present specification may achieve the following technical advantage. The apparatus based on the present specification may perform an operation of repeatedly transmitting a sidelink-specific control signal separated from a synchronization signal. Accordingly, there is a technical advantage in that beam paring can be effectively performed in a situation where a plurality of TX/RX beams for sidelink are present.

What is claimed is:

1. A method for a transmitting user equipment supporting sidelink, the method comprising:
    obtaining, by the transmitting user equipment, synchronization for the sidelink;
    transmitting, by the transmitting user equipment, control information for the sidelink to a receiving user equipment through a slot including (i) a first part, (ii) a transmit(TX)/receive(RX) switching part contiguous to the first part, and (iii) a second part contiguous to the TX/RX switching part, based on a plurality of TX beams;
    receiving, by the transmitting user equipment, TX beam information related to at least one of the plurality of TX beams from the receiving user equipment; and
    transmitting, by the transmitting user equipment, sidelink data to the receiving user equipment through at least one of the plurality of TX beams, based on the TX beam information,
    wherein the control information is transmitted to the receiving user equipment through a plurality of RX beams of the receiving user equipment,
    wherein each symbol of the first part is allocated to a combination of one of the plurality of TX beams and one of the plurality of RX beams,
    wherein the number of symbols included in the first part is determined based on the number of the plurality of TX beams and the number of the plurality of RX beams, and
    wherein the second part is allocated to receive the TX beam information from the receiving user equipment.

2. The method of claim 1,
    wherein the TX beam information includes beam pair information, and
    wherein the beam pair information includes information on at least one of the plurality of TX beams and at least one of the plurality of RX beams.

3. The method of claim 1, wherein the TX beam information includes ACKnowledgement (ACK)/Negative-ACKnowledgement (NACK) information of control information transmitted through at least one of the plurality of TX beams and at least one of the plurality of RX beams.

4. The method of claim 1, wherein the control information is transmitted through a physical sidelink control channel (PSCCH).

5. The method of claim 1, wherein the control information includes first information identifying the transmitting user equipment, second information identifying the receiving user equipment, and third information on a radio resource for the TX beam information.

6. The method of claim 1, further comprising transmitting, by the transmitting user equipment, information on one TX beam selected based on the TX beam information from among the plurality of TX beams to the receiving user equipment.

7. The method of claim 1, wherein the transmitting user equipment is configured to communicate with at least one of a wireless communication server and/or an autonomous vehicle.

8. An apparatus for a transmitting user equipment supporting sidelink, the apparatus comprising:
    a transceiver transmitting and receiving a radio signal; and
    a processor coupled to the transceiver to perform data processing for the sidelink,
    wherein the processor is configured to:
    control the transceiver to obtain synchronization for the sidelink;
    control the transceiver to transmit control information for the sidelink to a receiving user equipment through a slot including (i) a first part, (ii) a transmit(TX)/receive (RX) switching part contiguous to the first part, and (iii) a second part contiguous to the TX/RX switching part, based on a plurality of TX beams;

control the transceiver to receive TX beam information related to at least one of the plurality of TX beams from the receiving user equipment; and control the transceiver to transmit sidelink data to the receiving user equipment through at least one of the plurality of TX beams, based on the TX beam information, wherein the control information is transmitted to the receiving user equipment through a plurality of RX beams of the receiving user equipment, wherein each symbol of the first part is allocated to a combination of one of the plurality of TX beams and one of the plurality of RX beams, wherein the number of symbols included in the first part is determined based on the number of the plurality of TX beams and the number of the plurality of RX beams, and wherein the second part is allocated to receive the TX beam information from the receiving user equipment.

9. The apparatus of claim 8, wherein the TX beam information includes beam pair information, and wherein the beam pair information includes information on at least one of the plurality of TX beams and at least one of the plurality of RX beams.

10. The apparatus of claim 8, wherein the TX beam information includes ACKnowledgement (ACK)/Negative-ACKnowledgement (NACK) information of control information transmitted through at least one of the plurality of TX beams and at least one of the plurality of RX beams.

11. The apparatus of claim 8, wherein the control information is transmitted through a physical sidelink control channel (PSCCH).

12. The apparatus of claim 8, wherein the control information includes first information identifying the transmitting user equipment, second information identifying the receiving user equipment, and third information on a radio resource for the TX beam information.

13. The apparatus of claim 8, wherein the processor controls the transceiver to transmit information on one TX beam selected based on the TX beam information from among the plurality of TX beams to the receiving user equipment.

14. The apparatus of claim 8, wherein the transceiver is further configured to communicate with at least one of a wireless communication server and/or an autonomous vehicle.

15. A method for a receiving user equipment supporting sidelink, the method comprising:

obtaining, by the receiving user equipment, synchronization for the sidelink;

receiving, by the receiving user equipment, control information for the sidelink from a transmitting user equipment through a slot including (i) a first part, (ii) a transmit(TX)/receive(RX) switching part contiguous to the first part, and (iii) a second part contiguous to the TX/RX switching part, based on a plurality of RX beams;

transmitting, by the receiving user equipment, TX beam information related to at least one of the plurality of TX beams to the transmitting user equipment; and receiving, by the receiving user equipment, sidelink data from the transmitting user equipment through at least one TX beam selected based on the TX beam information, wherein the control information is received from the transmitting user equipment through a plurality of TX beams of the transmitting user equipment, wherein each symbol of the first part is allocated to a combination of one of the plurality of TX beams and one of the plurality of RX beams, wherein the number of symbols included in the first part is determined based on the number of the plurality of TX beams and the number of the plurality of RX beams, and wherein the second part is allocated to receive the TX beam information from the receiving user equipment.

16. The method of claim 15, wherein the receiving user equipment is configured to communicate with at least one of a wireless communication server and/or an autonomous vehicle.

* * * * *